United States Patent
Schiffer et al.

(10) Patent No.: US 12,339,440 B2
(45) Date of Patent: Jun. 24, 2025

(54) CORRECTION OPTICAL ELEMENTS FOR COHERENT BEAM COMBINING SYSTEMS AND SYSTEMS AND METHODS FOR COHERENT BEAM COMBINING USING SAME

(71) Applicant: ELBIT SYSTEMS ELECTRO-OPTICS—ELOP LTD., Rehovot (IL)

(72) Inventors: Zeev Schiffer, Rehovot (IL); Daniel Levy, Rehovot (IL); Ran Zvi Marom, Rehovot (IL)

(73) Assignee: ELBIT SYSTEMS ELECTRO-OPTICS—ELOP LTD., Rehovot (IL)

( * ) Notice: Subject to any disclaimer, the term of this patent is extended or adjusted under 35 U.S.C. 154(b) by 0 days.

(21) Appl. No.: 18/403,769

(22) Filed: Jan. 4, 2024

(65) Prior Publication Data

US 2024/0201485 A1    Jun. 20, 2024

Related U.S. Application Data

(63) Continuation of application No. PCT/IL2022/050732, filed on Jul. 6, 2022.

(30) Foreign Application Priority Data

Jul. 8, 2021    (IL) .......................................... 284740

(51) Int. Cl.
  *G02B 27/00*    (2006.01)
  *G02B 6/26*    (2006.01)

(52) U.S. Cl.
  CPC ......... *G02B 27/0025* (2013.01); *G02B 6/262* (2013.01)

(58) Field of Classification Search
  CPC ...... G02B 27/0025; G02B 6/262; G02B 6/32; G02B 5/045; G02B 27/4216;
  (Continued)

(56) References Cited

U.S. PATENT DOCUMENTS 3,476,463 A    11/1969 Kreuzer
5,392,119 A    2/1995 McArthur et al.
(Continued)

FOREIGN PATENT DOCUMENTS

CN    108318892 A  *  7/2018  ............. G01S 17/90
CN    208255550 U    12/2018
(Continued)

OTHER PUBLICATIONS

Machine translation of CN108318892 (Year: 2018).*
(Continued)

*Primary Examiner* — Thomas K Pham
*Assistant Examiner* — Kuei-Jen L Edenfield
(74) *Attorney, Agent, or Firm* — S.J. Intellectual Property Ltd.

(57) ABSTRACT

A correction optical element (COE) for a multi-channeled coherent beam combining (CBC) system that uses a fiber array comprising multiple optical fibers and a single collimation array comprising multiple collimating lenses, for coherent combining of a corresponding array of optical beams directed through the fiber array. The COE is configured for customized and segmented correction of collimation-based optical aberrations, caused at least due to misalignments between each corresponding optical fiber's $L_{ij}$ output end and a center of a corresponding collimating lens $L_{ij}$.

19 Claims, 10 Drawing Sheets

(58) Field of Classification Search
CPC .............. G02B 3/0056; G02B 5/0231; G02B 27/0905; G02B 3/005; G02B 27/00; G02B 6/26; G02B 5/04; G02B 27/42; G02B 3/00; G02B 5/02; G02B 27/09; H01S 3/1301; H01S 3/1307; H01S 3/2383; H01S 3/1305; H01S 3/005; H01S 5/4012; H01S 5/4025; H01S 3/13; H01S 3/23; H01S 3/00; H01S 5/40

USPC ................................................ 359/618–628

See application file for complete search history.

(56) References Cited

U.S. PATENT DOCUMENTS

| | | | |
|---|---|---|---|
| 5,717,516 | A | 2/1998 | Klein et al. |
| 6,128,134 | A | 10/2000 | Feldman et al. |
| 6,975,458 | B1 | 12/2005 | Kanzler |
| 7,130,113 | B2 * | 10/2006 | Shakir .................. H01S 3/2383 359/337 |
| 7,234,810 | B2 | 6/2007 | Warden et al. |
| 7,283,702 | B2 | 10/2007 | Brosnan et al. |
| 8,277,060 | B2 | 10/2012 | Cook |
| 9,366,872 | B2 | 6/2016 | Honea et al. |
| 10,267,992 | B1 | 4/2019 | Goodno et al. |
| 10,882,143 | B2 | 1/2021 | Kumkar et al. |
| 2004/0057010 | A1 | 3/2004 | Altmann |
| 2004/0091269 | A1 | 5/2004 | Green et al. |
| 2005/0105048 | A1 | 5/2005 | Warden et al. |
| 2005/0157762 | A1 | 7/2005 | Demaria et al. |
| 2006/0067611 | A1 | 3/2006 | Frisken et al. |
| 2006/0256335 | A1 | 11/2006 | Chen |
| 2007/0217740 | A1 | 9/2007 | Brosnan et al. |
| 2007/0273957 | A1 | 11/2007 | Zalevsky et al. |
| 2008/0219668 | A1 | 9/2008 | Barbarossa |
| 2012/0257853 | A1 | 10/2012 | Colbourne et al. |
| 2015/0234195 | A1 | 8/2015 | Honea et al. |
| 2016/0094016 | A1 * | 3/2016 | Beach .................. G02B 27/46 359/558 |
| 2017/0052381 | A1 | 2/2017 | Huang et al. |
| 2021/0101823 | A1 | 4/2021 | Goodno et al. |
| 2021/0103152 | A1 | 4/2021 | Goodno et al. |
| 2021/0103154 | A1 | 4/2021 | Goodno et al. |
| 2021/0103155 | A1 | 4/2021 | Goodno et al. |
| 2022/0365340 | A1 * | 11/2022 | Nagashima .......... G02B 3/0043 |

FOREIGN PATENT DOCUMENTS

| | | |
|---|---|---|
| CN | 108318892 B | 4/2021 |
| EP | 2965852 B1 | 3/2017 |
| JP | 3070114 B2 | 7/2000 |
| WO | 2008087008 A1 | 7/2008 |
| WO | 2009014509 A2 | 1/2009 |
| WO | 2011019283 A1 | 2/2011 |
| WO | 2013056380 A1 | 4/2013 |
| WO | 2014031797 A1 | 2/2014 |
| WO | 2018204856 A1 | 11/2018 |
| WO | 2019182728 A1 | 9/2019 |
| WO | 2021067010 A1 | 4/2021 |
| WO | 2021067013 A1 | 4/2021 |
| WO | 2021067017 A1 | 4/2021 |
| WO | 2021067018 A1 | 4/2021 |
| WO | WO-2021153629 A1 * | 8/2021 ......... G02B 27/0025 |

OTHER PUBLICATIONS

Machine translation of WO20221153629 (Year: 2021).*

"Dual-axis beam correction for an array of single-mode diode laser emitters using a laser-written custom phase-plate"; https://www.osapublishing.org/oe/fulltext.cfm?uri=oe-17-26-23576&id=192937; vol. 17, Issue 26, pp. 23576-23581 (2009) •https://doi.org/10.1364/OE.17.023576; Natalia Trela, Howard J. Baker, Jozef. J. Wendland, and Denis R. Hall.

"Method of fabricating an array of diffractive optical elements by using a direct laser lithography"; https://link.springer.com/article/10.1007/s00170-018-3058-7; Young-Gwang Kim, Hyug-Gyo Rhee, Young-Sik Ghim & Yun-Woo Lee ; Published: Nov. 23, 2018; vol. 101, pp. 1681-1685, (2019).

Vishwa Pal, Chene Tradonsky, Ronen Chriki, Natan Kaplan, Alexander Brodsky, Mickael Attia, Nir Davidson, and Asher A. Friesem, "Generating flat-top beams with extended depth of focus," Appl. Opt. 57, 4583-4589 (2018).

J. D. Mansell, T. Rutherford, W. Tulloch, M. Olapinski, M. Fejer and R. L. Byer, "Gaussian to super-Gaussian laser beam intensity profile conversion using glass micro-optic fabricated with reflowed photoresist," Conference on Lasers and Electro-Optics (CLEO 2000). Technical Digest. Postconference Edition. Tops vol. 39 (IEEE Cat. No. 00CH37088), San Francisco, CA, USA, 2000, pp. 406-407, doi: 10.1109/CLEO.2000.907180.

Carlos González Gómez, "Laser Beam Shaping", Master's thesis, Brno University of Technology, 2012. In: https://repositorio.unican.es/xmlui/bitstream/handle/10902/1483/349738.pdf.

* cited by examiner

CORRECTION OPTICAL ELEMENTS FOR COHERENT BEAM COMBINING SYSTEMS AND SYSTEMS AND METHODS FOR COHERENT BEAM COMBINING USING SAME

TECHNICAL FIELD

The present disclosure relates in general to optical elements for correction of optical aberrations and more particularly to correction optical elements used for correction of optical aberrations in multi-channeled optical systems.

BACKGROUND

Near diffraction-limit High power lasers, such as amplification fiber lasers (fiber amplifiers), have a variety of scientific and industrial implementations and enable achieving high power output optical signals.

Coherent beam combing (CBC) is used for combining multiple optical beams (channels) of overlapping or identical wavelengths or narrow wavelengths bands into a single output beam.

CBC systems may be implemented by using a phased array CBC (also known as "side-by-side CBC") using an array of collimators (lenslet array), each collimating a separate incoming optical beam. Other techniques for CBC involve using one or more diffraction grating elements (also known as "field aperture techniques").

SUMMARY

Aspects of disclosed embodiments pertain to a correction optical element (COE) for a multi-channeled specific coherent beam combining (CBC) system, wherein the CBC system uses a fiber array comprising multiple optical fibers and a single collimation array comprising multiple collimating lenses each configured for collimation of an incoming optical beam outputted from each of the optical fibers, for coherent combining of a corresponding array of optical beams directed through the fiber array, wherein each pair of: a collimating lens of the collimation array and a corresponding optical fiber of the fiber array, defines a channel (ij), wherein the COE comprises at least:

an array of correction segments, each correction segment (CSij) in the array of correction segments of the COE is customized in location and configuration to correct one or more optical aberrations of a corresponding output optical beam (Bij) outputted from each corresponding collimation lens (Lij) and a corresponding optical fiber (Fij), wherein the COE is configured for customized and segmented correction of optical aberrations, caused at least due to misalignment between each corresponding optical fiber's (Fij) output end and a center of a corresponding collimating lens (Lij), wherein the COE is configured for improving far field performances of the CBC system, wherein each correction segment (CSij) is designed by:

measuring wavefront of a respective output optical beam (Bij), emanating from a respective optical fiber (Fij) of the fiber array and outputted from a respective collimator (Cij) of the collimation array; and generating a three-dimensional (3D) model of the correction segment (CSij) of the respective channel (ij), wherein the 3D model of the correction segment (CSij)

is a 3D mirror image of the measured wavefront of the output optical beam (Bij) of the channel (ij), and wherein the correction segment (CSij) is configured as a diffractive element.

According to some embodiments, the COE is configured to segmentally correct, for each output optical beam (Bij), any one or more optical aberrations of: pointing errors; focusing/collimation errors; wavefront aberrations; high-order three dimensional aberrations, spatial distribution errors; comatic aberrations; field curvature aberrations, cylinder aberrations; smile errors, manufacturing errors, errors in spaces between collimating lenses in the collimation array.

According to some embodiments, the COE is made of a monolithic piece being customized to have each correction segment (CSij) thereof differently custom shaped to correct one or more aberrations of the corresponding output optical beam (Bij) of the respective channel (ij).

According to some embodiments, the COE may be further designed for a CBC system in which each optical fiber connects to an input surface of a corresponding part of an endcapping element.

According to some embodiments, the COE is integrally connected to or configured over an output surface of the collimation array.

According to some embodiments, the COE is integrally or non-integrally connected to an input surface of the collimation array, wherein bulges of lenses of the collimation array form the output surface of the COE and custom-shaped correction segments are located over an input surface of the COE, facing an output surface of an endcapping element.

According to some embodiments, the COE is embedded in the collimation array and an endcapping element of the CBC system, forming a single monolithic coherent beam combination, endcapping and correction element by having an output surface of the endcapping element integrally connected to an input surface of the collimation array and an output surface of the collimation array having a correcting 3D design embossed or debossed thereover for performing combined customized and segmented collimation and aberration correction of each optical beam.

Other aspects of disclosed embodiments, pertain to a method for fabricating a correction optical element (COE) for a specific multi-channel coherent beam combining (CBC) system having an array of channels, using a fiber array, which is an array of optical fibers and a collimation array comprising multiple collimating lenses each collimating lens being configured for collimation of an incoming optical beam, for coherent combining of an array of input optical beams outputted by an endcapping element, the method comprising:

(a) For Each Channel (Ij) of the CBC System:

measuring wavefront of a respective output optical beam (Bij), emanating from a respective optical fiber (Fij) of the fiber (Fij) array and outputted from a respective collimator (Cij) of the collimation array;

generating a three-dimensional (3D) model of the correction segment (CSij) of the respective channel (ij), wherein the 3D model of the correction segment (CSij) is a 3D mirror image of the measured wavefront of the output optical beam (Bij) of the corresponding channel (ij);

(b) fabricating a COE having an array of correction segments, by configuring each segment of the COE according to its respective generated 3D model;

(c) placing the COE at a determined positioning for optimal aberrations correction such that each correction segment (CSij) of the COE is positioned in a desired positioning in respect to its corresponding output optical beam (Bij); and (d) using the COE to simultaneously correct optical aberrations of at least some of the output optical beams of the CBC system;

wherein the COE is configured for customized and segmented correction of optical aberrations, caused due to misalignments between a respective optical fiber's output end and a center of a corresponding collimating lenslet (Lij) of the collimation array of the specific CBC system, wherein the COE is configured for improving far field performances of the CBC system, and wherein each correction segment (CSij) is configured as a diffractive element.

According to some embodiments, the COE is configured to segmentally correct one or more optical aberrations, for each output optical beam (Bij), of: pointing errors; focusing/collimation errors; wavefront aberrations; high-order three dimensional aberrations, spatial distribution errors; comatic aberrations; field curvature aberrations, cylinder aberrations; smile errors, manufacturing errors, errors in spaces between collimating lenses in the collimation array.

According to some embodiments, each output optical beam (Bij), measured for determination of its respective one or more aberrations is directed from a respective optical fiber (Fij), through the endcapping element towards a correction input surface of the COE, wherein the collimation array is formed as an output surface of the COE.

According to some embodiments, the method further comprises directing light emanating from a single light source to the fiber array, using one or more optical splitting elements.

According to some embodiments, each wavefront of the output optical beam (Bij) for each channel (ij) is measured by using one or more optical detectors and the 3D model is determined by using a processing and control unit, configured to receive and analyze output data outputted by the one or more optical detectors.

According to some embodiments, the one or more optical detectors comprise one or more of: a camera, a charged coupled device (CCD), an array of photodiodes or photo detectors, M×N photo detectors each coupled to a different focusing lens or lenslet for separately measuring optical characteristics including the one or more optical aberrations for each channel (ij).

According to some embodiments, the COE is configured to be essentially positioned in parallel to the collimation array.

Additional aspects of disclosed embodiments, pertain to a system for coherent beam combining (CBC) comprising at least:

at least one light source for irradiating light in a narrow wavelength band;

a fiber array, which is an array of optical fibers configured to guide light emanating from the at least one light source forming an array of input optical beams;

a collimation array, which is an array of collimating lenses, each collimating lens being configured for collimation of an incoming optical beam; and a correction optical element (COE) that is customized for segmented correction of optical aberrations of the specific CBC system, the COE comprising an array of correction segments, wherein each correction segment (CSij) is designed by:

measuring wavefront of a respective output optical beam (Bij), emanating from a respective optical fiber (Fij) of the fiber array and outputted from a respective collimator (Cij) of the collimation array; and generating a three-dimensional (3D) model of the correction segment (CSij) of the respective channel (ij), wherein the 3D model of the correction segment (CSij) is a 3D mirror image of the measured wavefront of the beam (Bij) of the channel (ij), wherein the correction segment (CSij) is configured as a diffractive element, wherein the COE is configured for customized and segmented correction of optical aberrations, caused at least due to misalignments between a respective optical fiber's output end and a center of a corresponding collimating lens (Lij) of the collimation array of the specific CBC system, and wherein the COE is configured for improving far field performances of the CBC system.

According to some embodiments, the CBC system further comprises:

one or more optical detectors located and configured to detect optical characteristics of a coherently combined output beam that has been combined by the collimation array and corrected by the COE;

a processing and control subsystem (PCS), configured to receive output data from the one or more optical detectors and analyze the received output data to measure one or more CBC system performances characteristics of the CBC system.

According to some embodiments, the CBC system further comprising a synchronization module for synchronizing phase and/or polarization of each channel (ij) such that all phases and/or polarizations of all channels are synchronized, the synchronization module comprising a phase synchronization module configured for phase synchronization and/or a polarization synchronization module for polarization synchronization.

According to some embodiments, each wavefront of each output optical beam (Bij) for each channel (ij) is measured by using the one or more optical detectors.

Each wavefront of the output optical beam (Bij) for each channel (ij) may be measured by using one or more optical detectors, and the 3D model may be determined by using a processing and control unit configured to receive and analyze output data outputted by the one or more optical detectors.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 1A shows a side view of at least part of the CBC system; FIG. 1B shows a side view of at least part of the CBC system including the illumination unit for providing the input optical beams to the multiple optical fibers of the CBC system; and FIG. 1C shows a frontal view of the correction optical element;

FIG. 2A shows a side view of at least part of the CBC system; and FIG. 2B shows a side view of at least part of the CBC system including the illumination unit for providing the input optical beams to the multiple optical fibers of the CBC system;

FIG. 3A shows a side view of at least part of the CBC system; and FIG. 3B shows a side view of at least part of the CBC system including the illumination unit for providing the input optical beams to the multiple optical fibers of the CBC system;

FIG. 4A shows a side view of at least part of the CBC system; and FIG. 4B shows a side view of at least part of the CBC system including the illumination unit for providing the input optical beams to the multiple optical fibers of the CBC system;

FIG. 9A shows a non-aberrated segment; and FIG. 9B shows an angular pointing error aberration;

FIG. 10A shows a non-aberrated segment; and FIG. 10B shows a defocusing aberration caused due to inaccuracies in radius of curvature of the specific lens of the specific channel; FIG. 11A shows a non-aberrated segment; and FIG. 11B shows aberrations caused to inaccuracies in fiber-to-lens connections (e.g. off-axis splicing of the fiber of the channel to the lens which may cause comatic (coma) aberration(s) and other wavefront aberrations).

DETAILED DESCRIPTION OF EMBODIMENTS

Figure 1A:
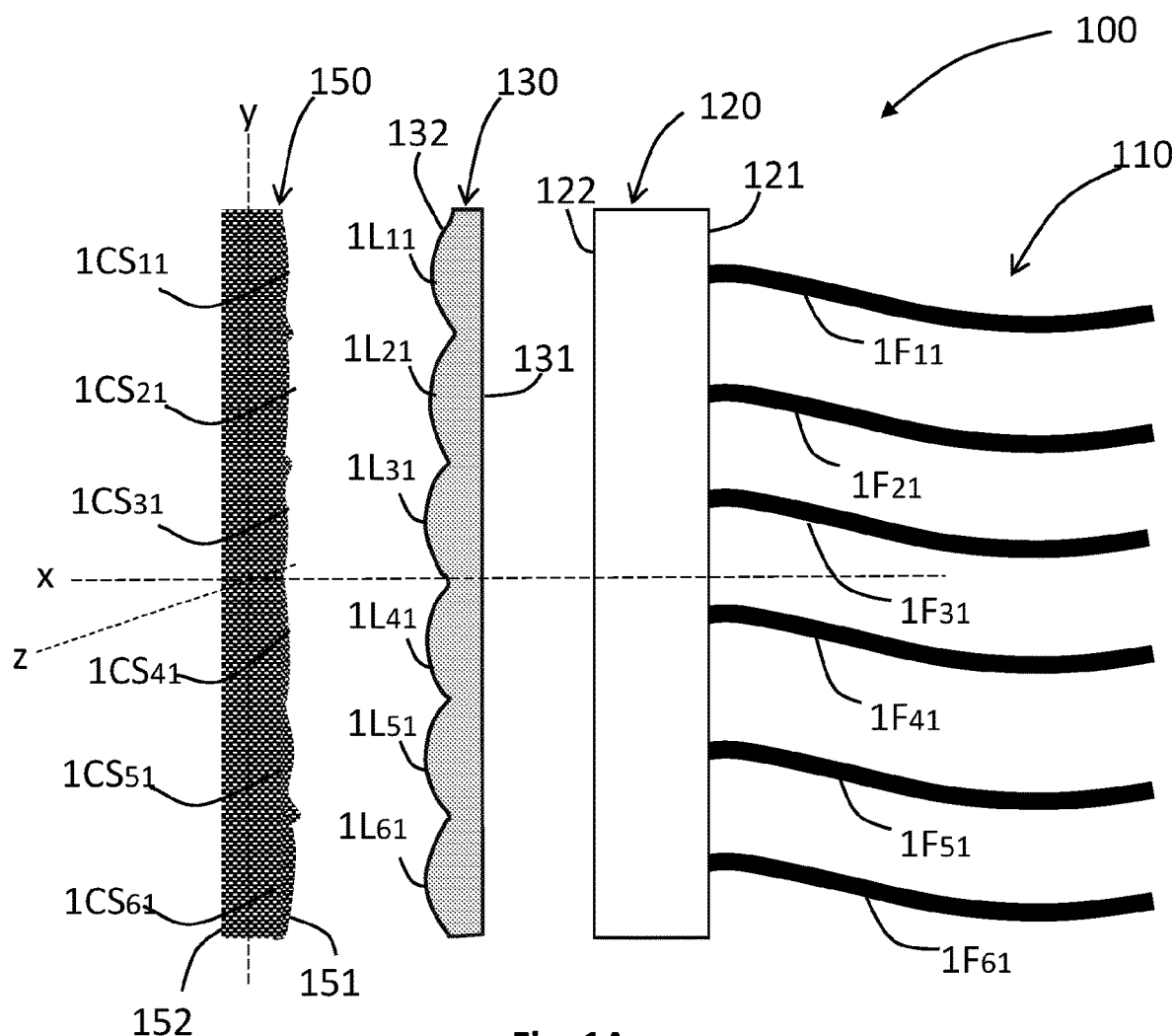
FIGS. 1A-1C show a coherent beam combining (CBC) system using a correction optical element having a custom-designed segmented embossment facing an output surface of a lenslet array of the CBC system, according to some embodiments.

Aspects of disclosed embodiments pertain to a correction optical element (COE), customized for a specific coherent beam combining (CBC) system, the CBC system uses at least an M×N optical fibers and a M×N collimating lenslet array and an endcapping element connected (e.g. via fusion splicing) at a flat input surface thereof to the M×N optical fibers' output ends, for coherent combining of corresponding M×N optical beams ("channels"), where M and N are integer numbers equal to or larger than 1 (N≥1; M≥1). Correcting aberrations that are specific to the CBC system in a customized manner may dramatically improve the CBC system's far field (FF) performances e.g., in terms of FF energy distribution, spatial coherence of the combined beam etc.

According to embodiments, the COE is custom-fabricated for segmented correction of the unique and specific optical aberrations of the specific single CBC system that the COE is to be used in, by having M×N correction segments, each correction segment CSij being customized in location and configuration to correct specific and premeasured one or more optical aberrations of a corresponding output beam Bij outputted from each channel "ij" of the CBC system, where "i" is an integer number representing the line number between 1 to M and "j" is an integer number representing the column number between 1 to N.

In some embodiments, the COE may be configured to segmentally correct optical aberrations affecting the coherent beam combining performances of the specific CBC system, caused, for instance, by inaccuracies in relative position between a respective optical fiber's output end and a center of a corresponding collimating lens Lij (e.g. microlens) of the lenslet array of the specific CBC system.

The correction of all aberrations of all segments may be done optically and simultaneously to all M×N channels.

According to some embodiments, the COE may be configured to segmentally correct any one or more of the following optical aberrations for each output optical beam Bij:
pointing errors;
focusing/collimation errors;
wave-front aberrations;
lateral beam misalignment errors;
spatial distribution errors of the entire combined output beam and/or each incoming beam Bij;
comatic (coma) aberrations;

Aspects of disclosed embodiments pertain to a method for fabricating a customized correction optical element (COE) for a particular coherent beam combining (CBC) system that may use a M×N optical fibers, an endcapping element connected at an input side thereof to the M×N optical fibers and a M×N collimating lenslet array, for coherent combining of M×N optical beams outputted by the endcapping element and emanating from output ends of the M×N optical fibers, the method may include at least the steps of:

measuring one or more optical aberrations Aij of each output beam Bij or channel ij emanating from each optical fiber Fij (where Aij may represent the one or more optical aberrations of the specific channel ij);

determining, for each segment CSij of the COE, the required correction design for correcting all or at least some of the measured optical aberrations of the respective channel ij, for the specific CBC system and for a particular location and positioning of the COE to be fabricated (which may result in a complete COE design data);

fabricating a COE for the specific CBC system, the COE having M×N segment, by configuring each segment of the COE according to its respective required correction design (e.g., according to the COE design data);

placing the COE at a determined positioning for optimal aberrations correction such that each segment CEij of the COE is positioned in an optimal positioning in respect to the output optical beam Bij; and using the COE to simultaneously correct optical aberrations of the specific CBC system.

According to some embodiments, the measuring of the optical aberration of each segment may be done by measuring overall spatial distribution of a FF combined beam and/or by segmented measuring of each output beam separately or each channel of the combined output beam of the CBC system, prior to being corrected by the COE to be designed.

The measuring of the optical aberrations may further be done by using all CBC required parts.

Aspects of disclosed embodiments pertain to a system for coherent beam combining (CBC) comprising:

at least one light source for irradiating light in a narrow wavelength band (WB);

M×N optical fibers configured to guide light emanating from the at least one light source;

a M×N collimating lenslet array, for coherent combining of the M×N optical beams from the M×N optical fibers; and a correction optical element (COE) that is customized for segmented correction of optical aberrations of the specific single CBC system, the COE comprising M×N correction segments, each correction segment CSij being customized in location and configuration to correct specific and premeasured one or more optical aberrations of a corresponding output beam Bij emanating from a corresponding optical fiber Fij of a respective ij channel.

According to some embodiments, the CBC system may also include optical means for splitting and/or directing the light emanating from the at least one light source into input end ("input ports") of the optical fibers.

According to some embodiments, the CBC system may further include means for phase and/or polarization locking/adapting/synchronizing for all beams of all M×N channels for improving far field (FF) performance: for example, obtaining a specific FF distribution which fulfills specific requirement(s) (such as optimal/maximal FF spatial coherence i.e.—maximal Power In Bucket (PIB), divergence angle of 90% energy [$\theta_{div}$], Peak Intensity (PI), etc.).

According to some embodiments, the CBC system may be similar or identical to one of the CBC systems described in Patent Application No.: IL275783, which is incorporated herein by reference in its entirety, using phase/polarization locking feedback loop(s), based on signals from M×N optical detectors.

It is noted herein that the terms "optical beam(s)" and "beam(s)" may be used herein interchangeably.

According to some embodiments, the optical fibers may include one or more of: high power fiber lasers, fiber amplifiers configured for guiding narrow-band light in the optical range such as in the infrared (IR), near infrared (NIR), ultraviolet (UV), near ultraviolet (NUV), and/or visible (VIS) range.

The operational center wavelength of a given fiber laser CBC realization may be within a range of 0.4-2.5 μm (micrometer) while at each case the wavelength is fixed with a typical narrow linewidth in the order of few GHz (Giga Hertz).

Aspects of disclosed embodiments pertain to a correction optical element (COE) for a multi-channeled coherent beam combining (CBC) system that uses a fiber array comprising multiple optical fibers and a single collimation array comprising multiple collimating lenses, for coherent combining of a corresponding array of optical beams directed through the fiber array.

Each pair of: a collimating lens of the collimation array and a corresponding optical fiber of the fiber array, may define a channel ij.

According to some embodiments, the COE may be custom-fabricated for segmented correction of optical aberrations of the specific single CBC system by having an array of correction segments, each correction segment CSij being customized in location and configuration to correct specific and premeasured one or more optical aberrations of a corresponding output optical beam Bij outputted from each corresponding pair of a collimation lens Lij and a corresponding optical fiber Fij.

The COE may be configured for customized and segmented correction of collimation-based optical aberrations, caused at least due to misalignments between each corresponding optical fiber's Lij output end and a center of a corresponding collimating lens Lij, where the correction of the optical aberrations of all channels of the system, is done optically and simultaneously by the COE, and where the COE may be located before or after the collimation array such that the coherent beam combining is done by first achieving an array of collimated and corrected optical beams at a near field location in respect to the location of the COE and collimation array.

Figure 1B:
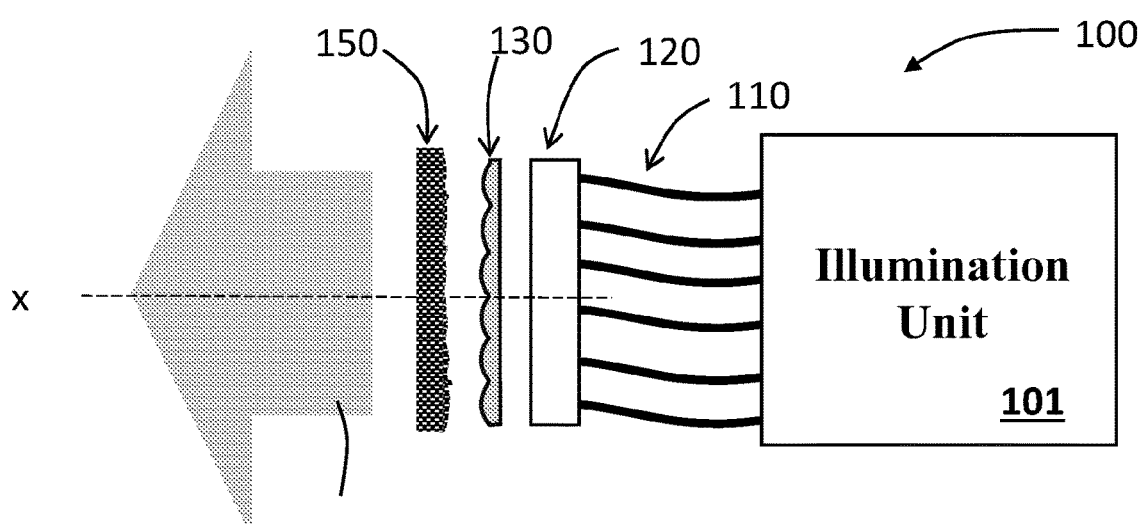
Figure 1C:
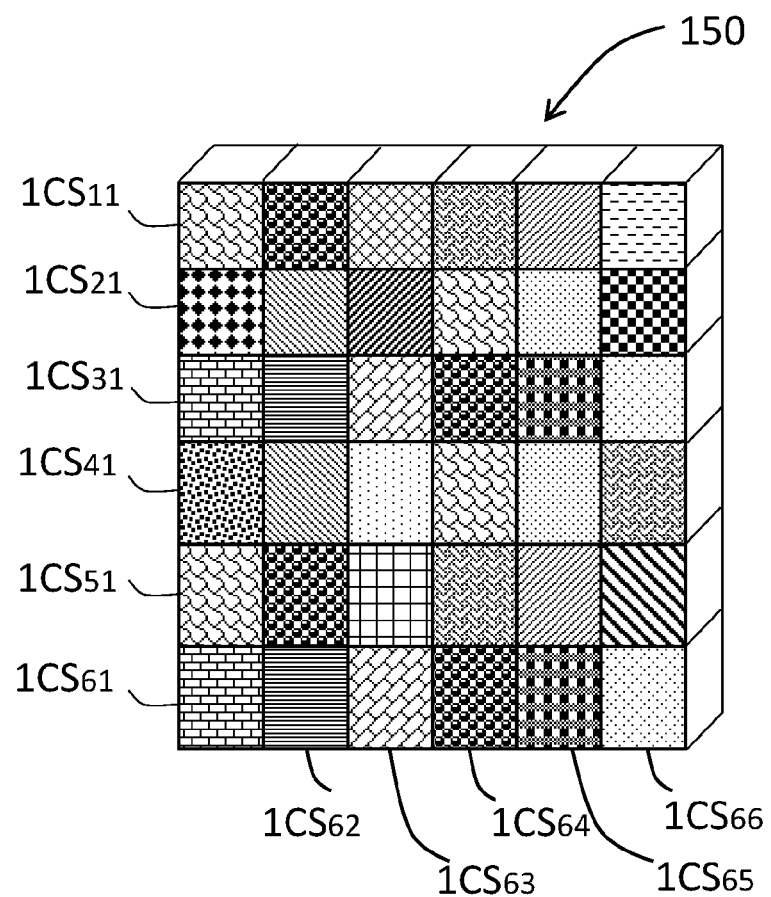

Reference is now made to FIGS. 1A-1C showing a coherent beam combining (CBC) system 100 using a separate correction optical element (COE) 150 for correction of optical aberrations of 6×6 (six by six) channels, according to some embodiments. The CBC system 100 includes:

an array of optical fibers 110 e.g., including 6×6 optical fibers from 1F11-1F66 such as: 1F11, 1F21, 1F31, 1F41, 1F51, and 1F61 of column 1;

an endcapping element 120 connected to the 6×6 optical fibers 110 at an input surface 121 thereof;

a lenslet array 130 element, having a flat input surface 131 thereof facing an output surface 122 of the endcapping element 120 and an opposite output surface 132 having 6×6 bulges for collimating the beams exiting the endcapping element's 120 output surface 122. The lenslet array's 130 first column including integrally connected lenses 1L11-1L61; and a segmented COE 150 having an input surface 151 thereof facing the bulged output surface 132 of the lenslet array 130 and a flattened output surface 152 from which all beams emanating from the optical fibers 110 exit as the final combined and corrected and coherently combined output beam 105, the COE's 150 first column including integrally connected correction segments 1CD11-1CS61, each CSij having, for example, one or more prism shaped (e.g. pyramid-shaped) wedges embossed, curved, coated or etched thereover.

As shown in FIG. 1B, the optical fibers 110 may be connected to one or more narrow band light sources e.g. via an illumination unit 101, including, for example multiple light emitting diodes (LED(s)) or a single light emitting diode (LED) split into M×N parts, using one or more light dividing means, to irradiate each optical fiber of the optical fibers 110.

As schematically illustrated in FIG. 1C, the COE 150 has 6×6 segments 1CS11-1CS66, each correction segment CSij has a different and single customized wedges embossment/etching/coating/molding to correct optical aberrations of the respective beam Bij of the corresponding channel ij.

According to some embodiments, the COE 150 is designed to optically and automatically correct, at least aberrations caused due to inaccuracies in relative position between a respective optical fiber's output end and a center of a corresponding collimating lens Lij of the lenslet array of the specific CBC system, and/or inaccuracies in alignments and/or inaccuracies in surfaces' relative locations' within each element and/or in relation to one another (e.g., inaccuracies in parallelism level of the input and output surfaces of the endcapping element 120, misalignment between he endcapping element 120 and the lenslet array 130, dispositioning of one or more of the optical fibers 110 in their connecting point to the input surface 121 of the endcapping element 120, inaccuracies in spaces between lenses of the lenslet array 130, etc.)

All channels 11-66 are simultaneously and optically collimated and corrected.

As shown in FIGS. 1A-1B, the endcapping element 120, the lenslet array 130 and the COE 150 may be aligned to one another in respect to an optical axis x such that the segmentation layout is located over planes that are parallel to a yz plane, which is perpendicular to the x axis.

Figure 2A:
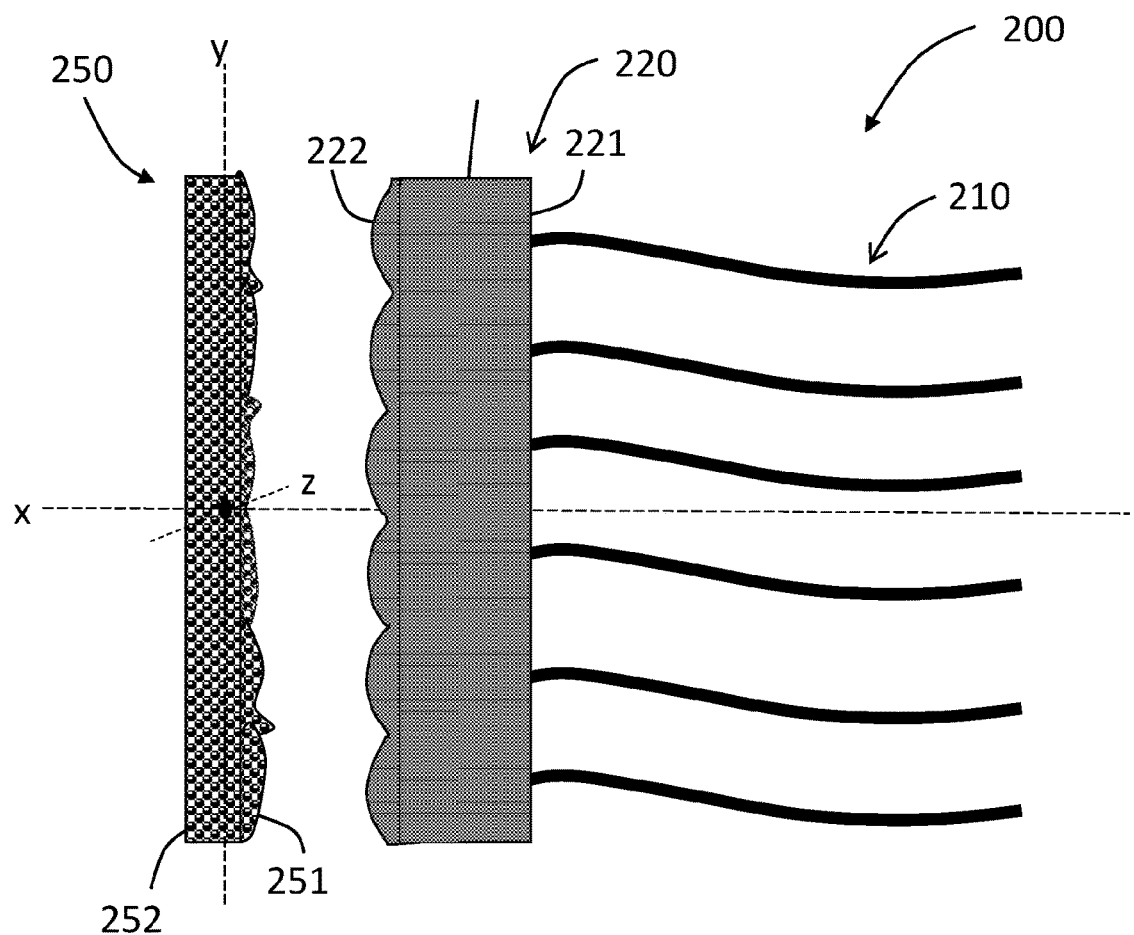
FIGS. 2A-2B show a coherent beam combining (CBC) system using a correction optical element having a custom-designed segmented embossment, engravement, or etching input surface thereof, facing an output surface of a lenslet array of the CBC system, according to some embodiments.
Figure 2B:
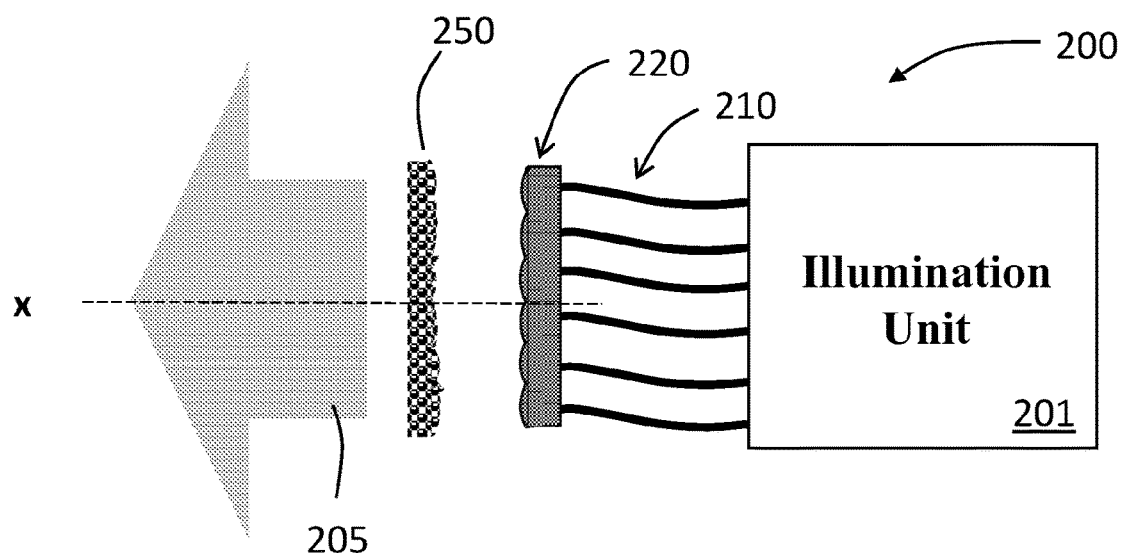

Reference is now made to FIGS. 2A-2B showing a coherent beam combining (CBC) system 200 using a COE 250, according to other embodiments.

As shown in FIG. 2A, the endcapping element is integrally combined with the lenslet array forming a monolithic combined lenslet array 220 connected (e.g., spliced) to a flat input surface 221 of the lenslet array 220, where the beams emanating from the optical fibers 110 are collimated by lens-shaped bulges of an opposite parallel output surface 222 of the lenslet array 220.

The input surface 251 of the COE 250 faces the bulged output surface 222 of the lenslet array 220 where all beams emanating from the optical fibers 110 exit as the final combined and corrected output beam 205 (see FIG. 2B), exit from a flattened output surface 252 of the COE 250.

As shown in FIG. 2B, the optical fibers of the optical fibers set 210 may be connected to one or more narrow band light sources e.g. via an illumination unit 201, including, for example multiple light emitting diodes (LED(s)) or a single LED split into M×N parts, using one or more light dividing means, to irradiate each optical fiber of the optical fibers set 210.

As schematically illustrated in FIG. 1C, the COE 150 has 6×6 segments 1CS11-1CS66, each correction segment CSij has a different and single customized wedges embossment/etching/coating to correct optical aberrations of the respective beam Bij of the corresponding channel ij.

According to some embodiments, the wedged embossment/etching may be designed for diffraction of the incoming beam for correcting aberrations thereof.

In the example shown in FIGS. 1A-1C and 2A-2B, the COE 150/250 segmented correction embossments/etchings are located at an input surface 151/251 of the COE 150/250 facing an output surface 132/222 of the lenslet array 130/220. However, in other embodiments, the segmented correction embossments/etchings of the COE may be located at an opposite output surface of the COE where the input surface of the COE facing the lenslet array's output surface may be flat.

As shown in FIGS. 2A-2B, the combined lenslet array 220 and the COE 250 may be aligned to one another in respect to an optical axis x such that the segmentation layout is located over planes that are parallel to a yz plane, which is perpendicular to the x axis.

Figure 3A:
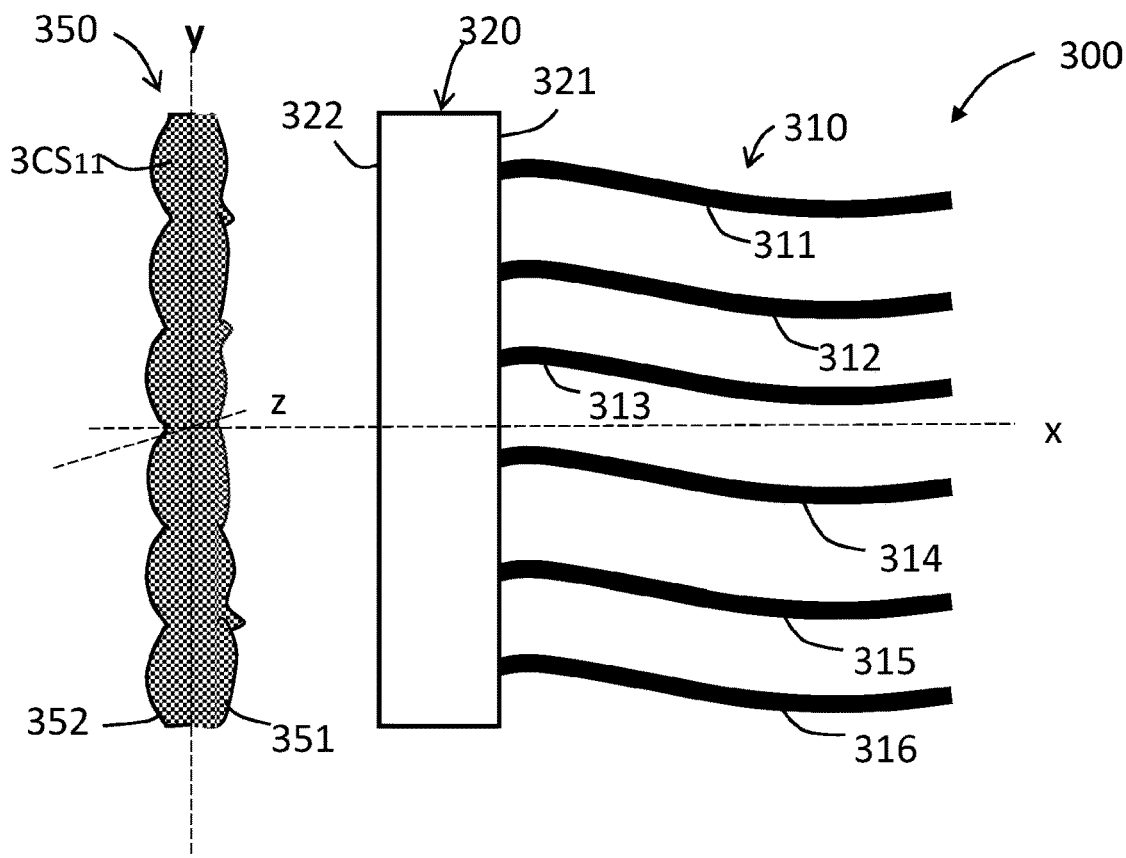
FIGS. 3A-3B show a coherent beam combining (CBC) system using a correction optical element that is integrated with the lenslet array of the CBC system by having an input surface of the correction optical element include segmented embossments, or etchings and an output surface of the correction optical element having bulges for being used as the collimating lenslet array.
Figure 3B:
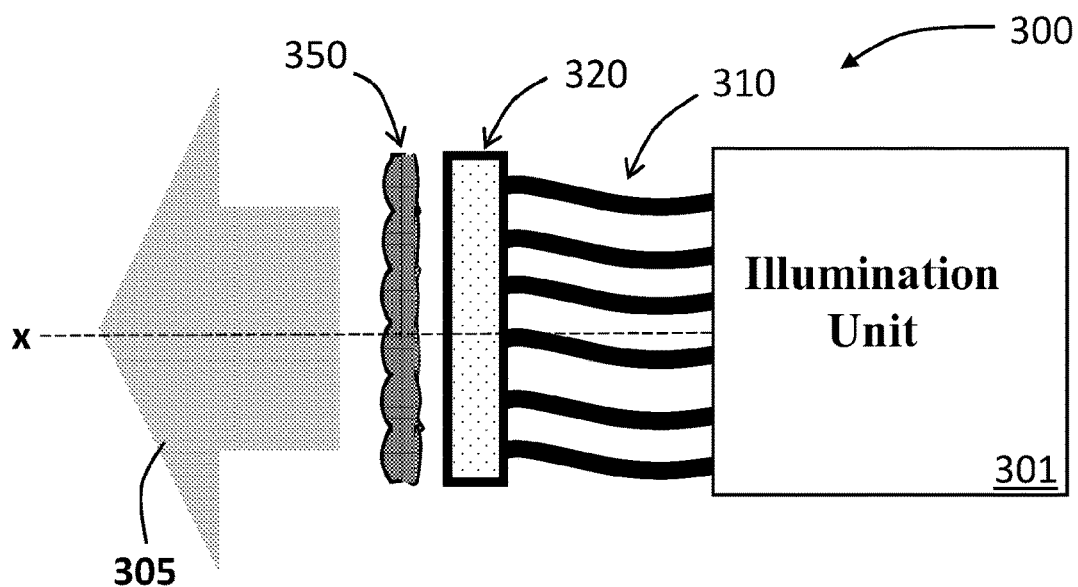

Reference is now made to FIGS. 3A-3B showing a coherent beam combining (CBC) system 300 using a COE 350 that is integrated with the lenslet array of the CBC system 300 according to some embodiments.

In this case, an array of 6×6 optical fibers 310 e.g., where the first column of the array includes optical fibers: 311, 312, 313, 314, 315 and 316, is spliced to an input surface 321 of an endcapping element 320 and the combined COE 350 has an input surface 351 facing an output surface 322 of the endcapping element 320, wherein the COE's input surface 351 has segmented correction embossments/etchings thereover to correct optical aberrations of beams exiting the endcapping element's 320 output surface 322. An output surface 352 of the COE 350 is bulged forming a lenslet array for segmented collimating of the optical beams. Therefore, the COE 350 in this case combines optical aberration correction and les-arrayed collimation of the incoming beams for generating a combined output beam 305 that is optimally corrected and collimated.

As shown in FIG. 3B, the optical fibers 310 may be connected to one or more narrow band light sources e.g. via an illumination unit 301, including, for example multiple light emitting diodes (LED(s)) or a single LED split into M×N parts, using one or more light dividing means, to irradiate each optical fiber of the optical fibers 310.

Figure 4A:
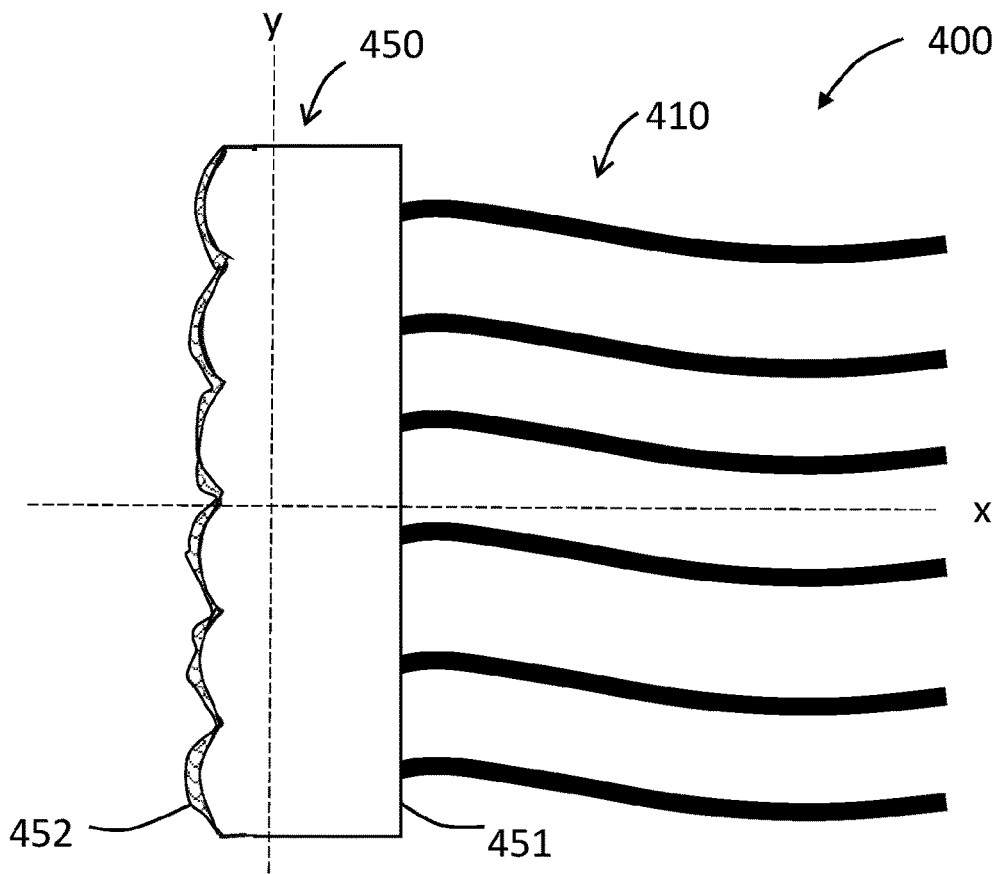
FIGS. 4A-4B show a coherent beam combining (CBC) system using a correction optical element having a custom-designed segmented embossment or etching over an output surface thereof, where the correction optical element is integrated with the lenslet array and an endcapping element connecting at an input surface thereof to output ends of the optical fibers and serving as a monolithic integrated endcapping, collimation (combining) and correction element, according to some embodiments.
Figure 4B:
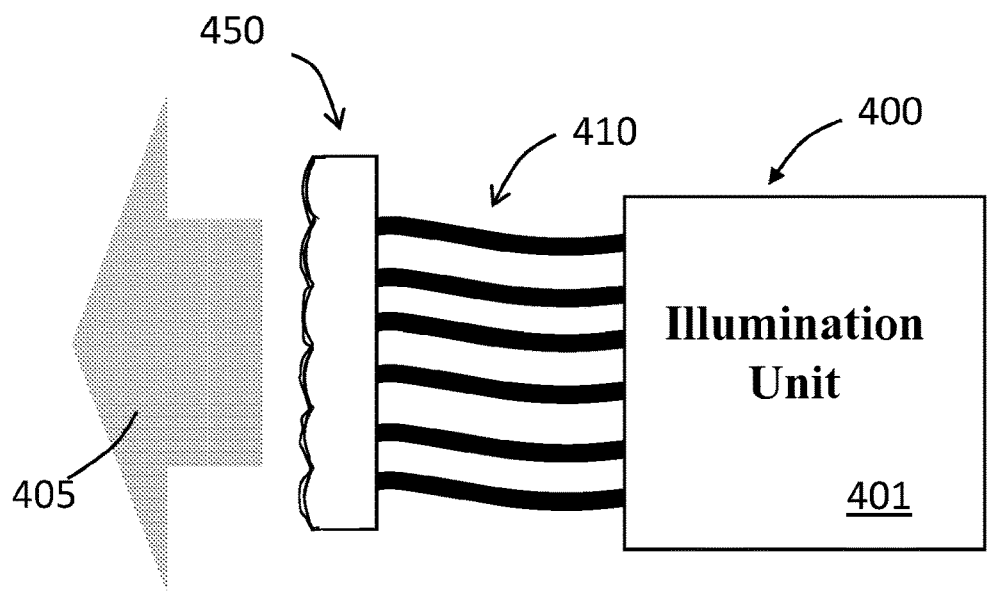

Reference is now made to FIGS. 4A-4B showing a coherent beam combining (CBC) system 400 using a combined COE 450 used as an endcap element, a collimating lenslet array and as an optical-aberrations' corrector, all in a single monolithic element directly connecting to an array of optical fibers 410 at an input side/surface 451 thereof, where the output surface 452 of the COE 450, from which the combined optical beam 405 exits, has bulges with embossed/coated/engraved designed over each bulge to serve both as a lenslet array for beam combining and to segmentally correct each lens (bulge) to enable corresponding segmented optical aberrations' correction. An illumination unit 401 may be used to controllably supply light to the optical fibers 410.

According to these embodiments, the COE 450 input surface 451 is flat to allow easy connecting (splicing) of the optical fibers' 410 output ends thereto and a bulgy output surface 452 where each lens-shaped bulge has a customized correction embossment/etching/coating thereover to form a combined output optical beam 405 of high beam quality in the FF.

Figure 5:
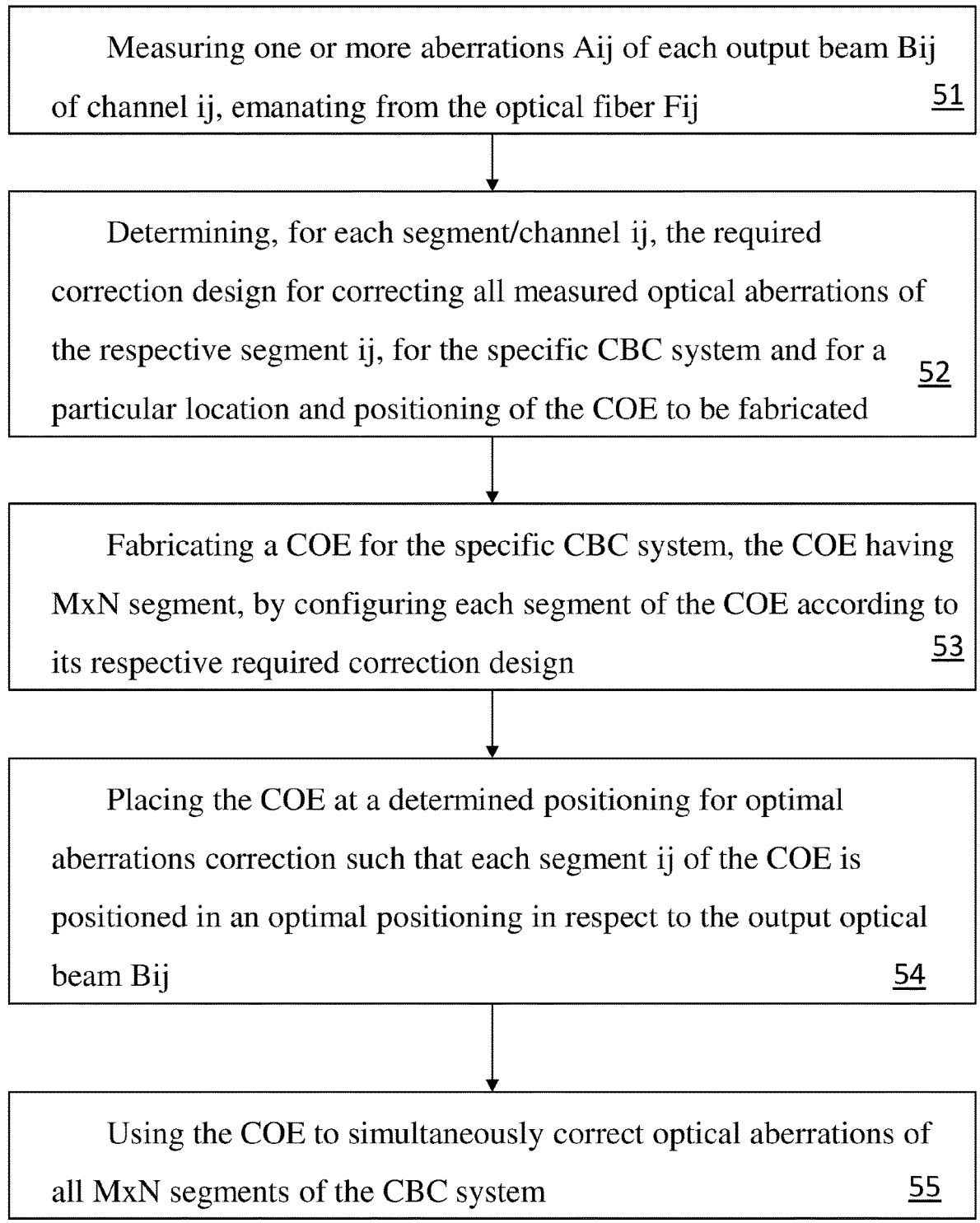
FIG. 5 is a flowchart, schematically illustrating a method for CBC using a customized correction optical element, according to some embodiments.

According to some embodiments, the CBC system of any of the examples above such as CBC systems 100, 200, 300 or 400, may also include any one or more of:
  focusing means for focusing the output combined optical beam;
  phase synchronization means for simultaneously synchronizing (e.g. by matching) phases of the beams of all channels of the M×N optical fibers;

Reference is now made to FIG. 5 showing a flowchart, schematically illustrating a method for CBC using a customized correction optical element, according to some embodiments. This method may include at least the steps of:

measuring one or more aberrations Aij of each output beam Bij or channel ij emanating from each optical fiber Fij 51;

determining, for each correction segment CSij of the COE to be fabricated for the specific CBC system, one or more required corrections design for correcting all measured optical aberrations of the respective correcting segment CSij, for the specific CBC system and for a particular location and positioning of the COE to be fabricated 52;

fabricating a COE for the specific CBC system, the COE having M×N segment (corresponding to the M×N channels of the CBC system), by configuring each segment of the COE according to its respective required correction design 53;

placing the COE at a determined positioning for optimal aberrations correction (e.g., by optically aligning the COE in respect to an optical plane of the optical fibers' output beams' propagation) 54; and using the COE to simultaneously correct optical aberrations of all M×N beams/channels of the CBC system 55.

According to some embodiments, aberrations of each channel ij may be separately measured (by operating illumination only through the channel's respective optical fiber Fij deactivating (turning off) light through all other fiber, in a measurement process that includes a channel-by-channel aberrations' detection. The segmented correction of each segment CSij may be calculated after each channel's aberrations are measured or after all channels have been measured.

In other embodiments all channels or some of them are simultaneously measured for segmented aberrations detection.

Figure 6:
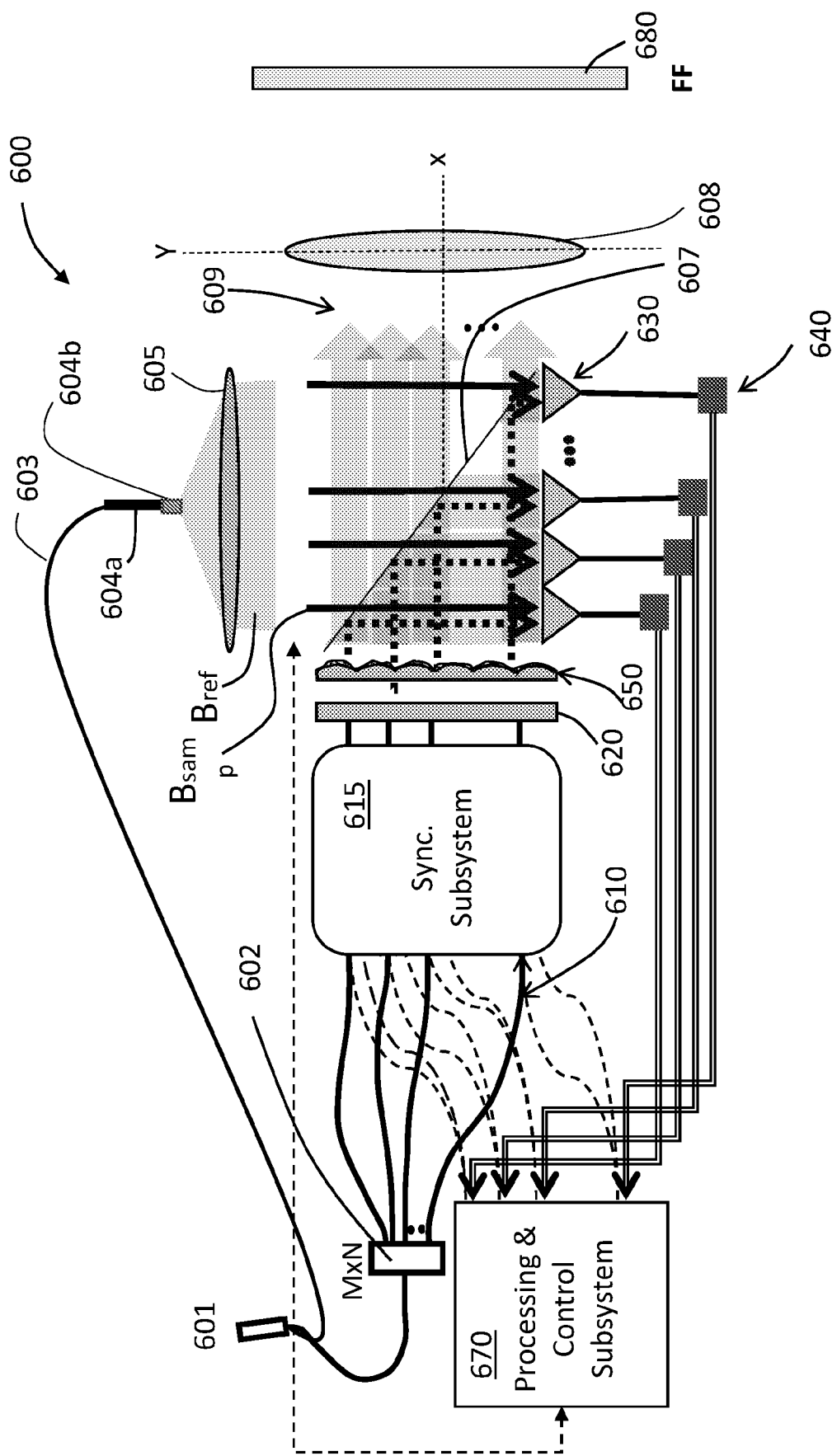
FIG. 6 shows an illustration of a CBC system using a customized correction optical element, according to some embodiments.

Reference is now made to FIG. 6 showing a CBC system 600 for M×N channels, using the customized COE, where the CBC system 600 is further configured for phase and/or polarization synchronization/locking, according to some embodiments.

The CBC system 600 includes:
- a light source 601 such as a LED source;
- an array of M×N optical fibers 610 including M×N optical fibers;
- a light dividing device 602 for splitting the light of the light source 601 into M×N separate input optical beams (herein "input beams") each input beam being directed to a separate optical fiber of the optical fibers 610 for CBC thereof, where the multiple input beams exit the optical fibers 610 array substantially parallel to one another and to a first optical axis x;
- a reference optical fiber 603 for delivering light from the light source 601 to serve as a reference beam $B_{ref}$ e.g., via an endcap 604a and/or a movable holder 604b located at an output end of the reference optical fiber 603, wherein the reference optical fiber 603 is located such that the reference beam $B_{ref}$ exiting therefrom and optionally also collimated by a collimator 605, is directed along a propagation direction that is parallel to an optical axis y which is substantially angular (e.g., perpendicular) to the axis x (e.g., perpendicular to the propagation direction of the input beams) such as to cause interference between the reference beam $B_{ref}$ and M×N input beams;
- a synchronization subsystem 615 for phase and/or polarization synchronization of all M×N input beams, using for instance a M×N set of phase shifters and/or polarizers for simultaneous synchronization of all channels;
- a combined lenslet array 650 (a lenslet array integrally combined with a COE by having correction embossments/engravings over the output surface of each lens in the array) optionally combined with a COE by having customized correction etchings or embossments over an output surface thereof, the combined lenslet array 650 being located and configured for combining the input beams into a combined output beam 609 and simultaneously correcting optical aberrations originating, for example, from inaccuracies in spaces between peaks of the lenses in the lenslet array, spaces between optical fibers 610 and/or inaccuracies in angular relations between the input beams outputted by the optical fibers 610 e.g., affecting parallelism accuracy;
- a beam splitter 607, located at a path of the combined output beam 609 and configured to split the combined output beam 609 into two beams propagating in an angular (e.g., perpendicular) directions, where a first part of the combined output beam 609 is directed in parallel to its original propagation direction along the x axis and the second part is directed angularly thereto for serving as a sample optical beam (herein also "sample beam") $B_{samp}$ signal passing in parallel to the reference beam $B_{ref}$ for causing the reference beam $B_{ref}$ and the sample beam $B_{samp}$ to optically interfere generating an interference optical signal which can be addressed segmentally by division into M×N segments and detecting optical characteristics such as intensity for each segment ij;
- a M×N array of optical detectors 640 located and configured to detect optical characteristics such as intensity, power, amplitude, and the like, of each optical interference signal OISij of each segment for enabling feedback-loop based phase/polarization locking for further improvement of FF beam quality and CBC system 600 performances; and
- a processing and control subsystem 670 operatively associated with the synchronization subsystem 615 and with the M×N optical detectors 640 for receiving output data/signals from all the optical detectors 640 and adjust phase/polarization of each of the channels ij, simultaneously, based on analysis of the received detectors' output data for real time synchronization of the phase/polarization of all M×N channels.

According to some embodiments, as shown in FIG. 6, the CBC system 600 may further include additional collimating and/or focusing means such as collimator 605 configured and located for collimating the reference beam outputted by the reference optical fiber 603 and/or collimator or focusing lens 608 configured and located for collimation/focusing of the outputted combined output beam 609.

According to some embodiments, as shown in FIG. 6, the CBC system 600 may further include an array of M×N focusing lenses 630 for segmentally focusing light from the sampling beam $B_{samp}$ onto each of the optical detectors 640.

According to some embodiments, the CBC system 600 may further include one or more endcapping elements, such as endcapping element 620 connectable to output ends of the optical fibers 610.

According to some embodiments, the CBC system 600 may be used for measuring its inherent specific optical aberrations per channel, using for instance, the same system configuration as shown in FIG. 6 with the combined lenslet array 650 prior to being embossed/etched for serving also as a COE or prior to adding a separate COE, to enable determining optical aberrations for each channel and based thereon to determine required segment correction design for each channel ij. Once the required correction for each segment are determined and a segment configuration design is generated/calculated, the correction segment can be etched/embossed over the lenslet array or over a separate piece (e.g., silicon piece) for fabricating a separate COE.

To measure the one or more optical aberrations OAij of each channel ij, the processing and control subsystem 670 may be further configured to analyze receive output data from the M×N optical detectors 640 for detecting optical aberrations' properties such as type, one or more related properties' parameters values, location etc. for each channel ij, and generate, based on analysis results (including determined properties of each optical aberration of each channel ij), a COE configuration design that includes the embossment/etching/coating design of each segment of the COE to be fabricated. The COE configuration design may include data indicative of, for example, a set of fabrication instructions for any one or more fabrication machines (e.g. for automatic fabrication), a geometrical model.

Additionally or alternatively, to measure optical aberrations of each channel ij, properties of a FF image of the combined output beam 609 may be detected and analyzed e.g. using a a segmented, pixelated or any other type of optical FF detector 680 configured for measuring one or more characteristics of the combined output beam 609.

For Example, a FF detector 680 output data can be used in combination with detector data arriving from the array of optical detectors 640 for determining sensitivity level of the FF to each optical aberration of the respective channel. Another plausible approach may be to use a wave-front sensing device such as curvature sensor or a Shack-Hartmann sensor or detection system, to determine the type of optical aberration, or distinguish different types of aberrations, characteristics and optionally also causes thereof, etc.

According to some embodiments the fabrication of the COE itself per each CBC system may be done by using one or more of the following techniques: embossment, curving, sputtering, evaporation, engraving, printing, nanolithography, ion-beam deposition etc.

Any one or more devices, machines and/or systems can be used for fabrication of the COE, such as, for example, a three-dimensional (3D) printer, a machine/device for sputtering, coating and evaporating/nano-etching, and the like may be used to form wedges of each segment of the COE (e.g. by nano-etching of a thin layer of anti-reflective (AR) coating over a silicon element's surface).

According to some embodiments, the manner in which a COE of a CBC system to be fabricated may be designed, may be carried out by using a standard CBC system (used for measurements of optical aberration for COEs fabrication for other CBC systems'-being used as a "CBC system model") instead of measuring specific aberrations of the specific CBC system to which the COE is to custom fit, depending on how significantly different are aberrations from one CBC system to another mainly depending on the influence of misalignments/positioning between each optical fiber of the CBC system and the lens to which it is connected/spliced, misalignment of the lenslet array in respect to other optical elements of the CBC system, manufacturing errors and imperfections of the optical elements such as the lenslet array, focusing elements, and the like. In some cases the difference in the specific CBC system's causes for optical aberrations is such that requires only customized COE design and fabrication for enabling high system performances such as high FF beam quality (e.g. low beam waste and high spatial coherency).

Figure 7:
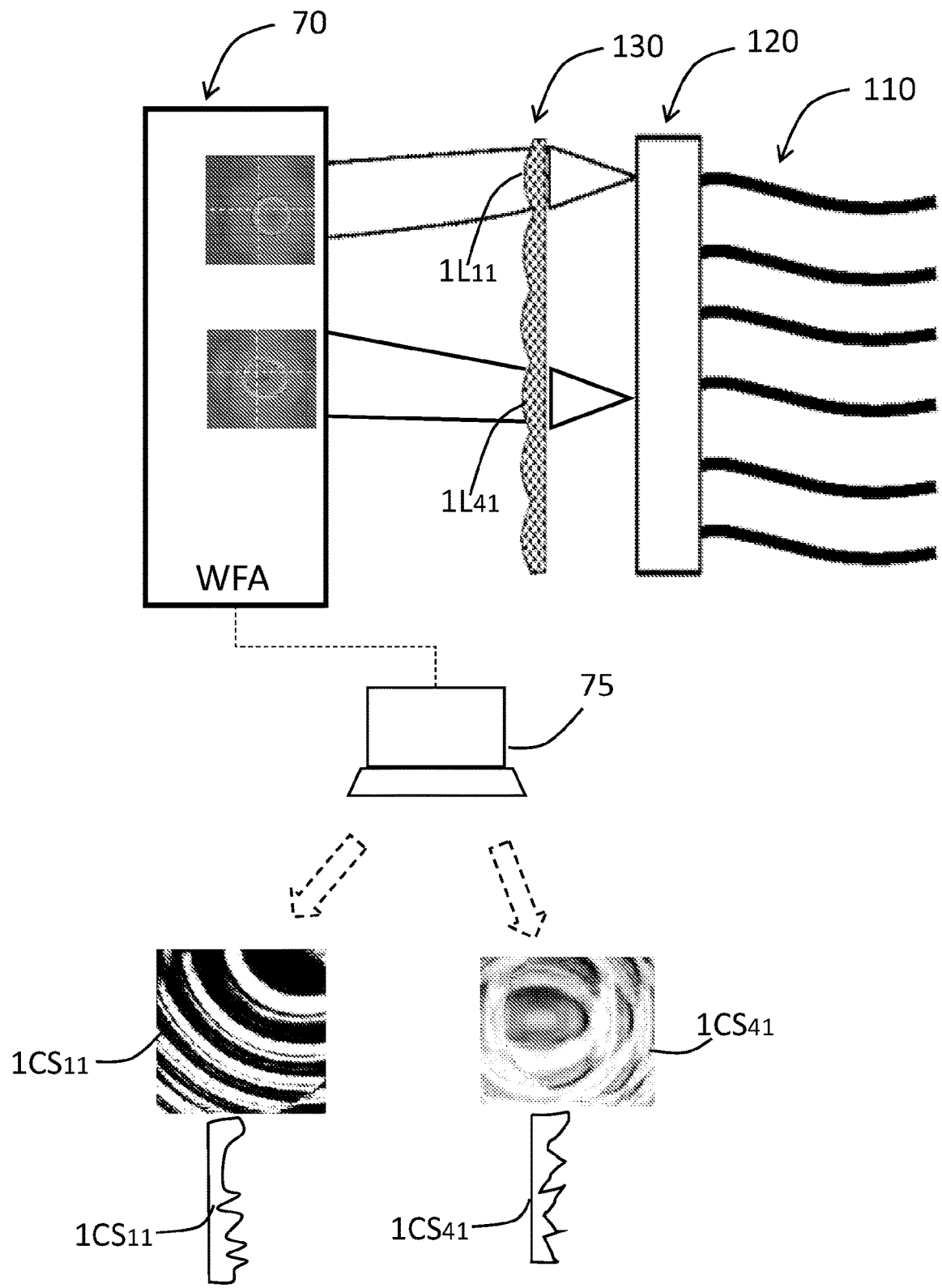
FIG. 7 shows a detection system for detection of aberrations of each channel of a multi-channel CBC system for determining required corrections for each channel of a CBC system, according to some embodiments.

Reference is now made to FIG. 7 schematically illustrating a detection system for detection of aberrations of each channel ij of a CBC system for determining required corrections for each channel of a CBC system, according to some embodiments. The detection system may include parts of a CBC system to later be used for CBC such as: an M×N array of optical fibers 110, spliced to an endcapping element 120 and a separate lenslet array 130 similar to elements/parts described for FIG. 1A. Each channel ij may be separately measured by a wavefront analyzer (WFA) subsystem 70 associated with one or more computing devices such as computing device 75 for detecting all aberrations of the respective channel ij and calculating (determining) a correction design for the respective ij segment.

For example, for detecting aberrations of Channel 11 or channel 41 the fiber F11 or F41 light outputted from collimating lens 1L11 of 1L41 is detected (e.g., simultaneously or one at a time). The WFA subsystem 70 may include an optical detector (such as a pixelated charged coupled device (CCD) or an array of photodiodes etc. or use the CBC system's detection means receiving data therefrom, for enabling segmented detection of optical characteristics of the wavefront outputted from the respective collimating lens 1L11 or 1L41 of the lenslet array 130. The aberrations may most likely be of different characteristics for each segment/channel and therefore require different aberration correction designs such as shown in FIG. 7, illustrating how channel 11 requires a correction design depicted in 1CS11 and channel 41 requires a different correction design depicted in 1CS14.

By detecting wavefront characteristic per channel (e.g. by channeling light only through the measured channel at a time), the correction of the channel's related segment can be calculated or designed by using a three-dimensional (3D) mirror-image, which may include a 3D correction model of the wavefront (which is equal in wavefront distribution having an opposite direction).

According to some embodiments, to allow mirroring the wavefront in the correct proportions (in respect to a size of each segment) the positioning of the optical detection means (e.g. CCD camera or M×N array of photodiodes) may require positioning thereof in the same alignment and distance in respect to the position of the COE to be fabricated or, the COE segment design may also correspond to the desired alignment and distance in which the COE is to be positioned in respect to the lenslet array 130.

Once correction-designs of all segments of the respective COE to be fabricated for the particular CBC system are determined (e.g. having 3D models thereof stored in a computer storage unit), the COE segments can be fabricated (e.g. using an ion-beam deposition process).

Figure 8:
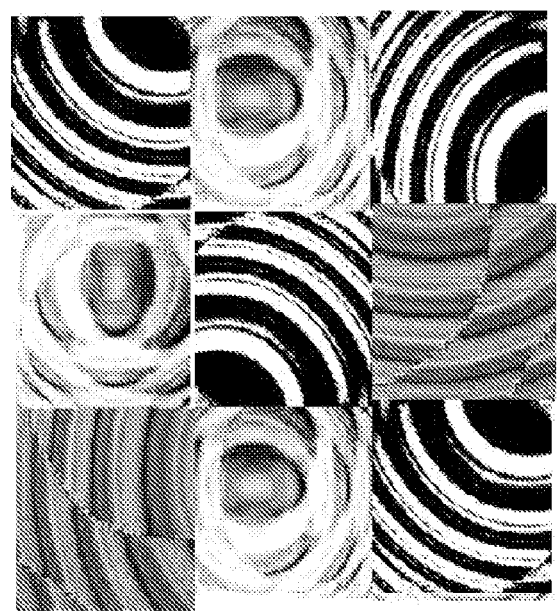
FIG. 8 shows an illustration of a 3×3 correction segments, curved or embossed over a correction optical element's surface, according to some embodiments.
Figure 9A:
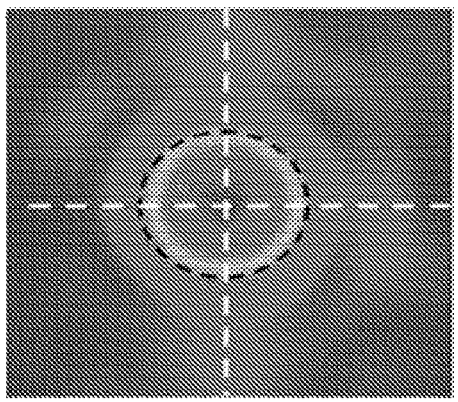
FIGS. 9A and 9B show measured images of a single channel collimated by one lenslet of a CBC lenslet array, where.
Figure 9B:
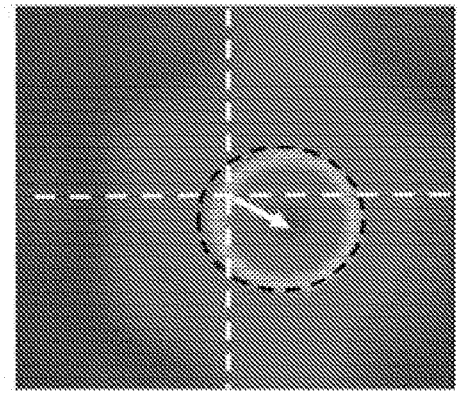
Figure 10A:
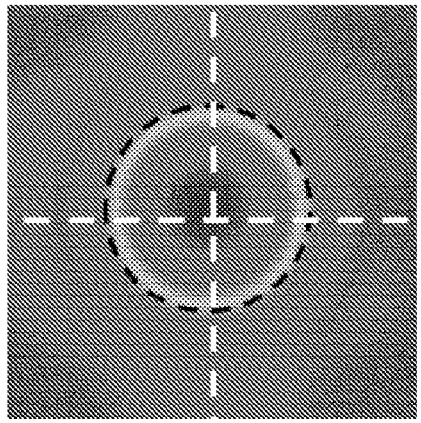
FIGS. 10A and 10B show measured images of a single channel collimated by one lenslet of a CBC lenslet array, where.
Figure 10B:
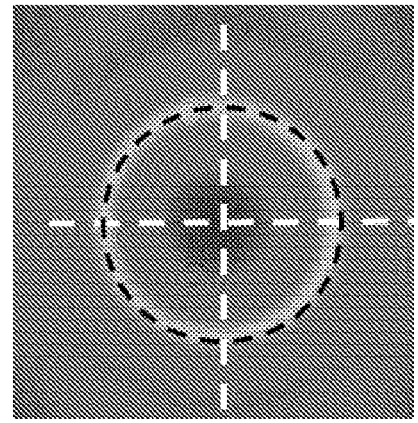
Figure 11A:
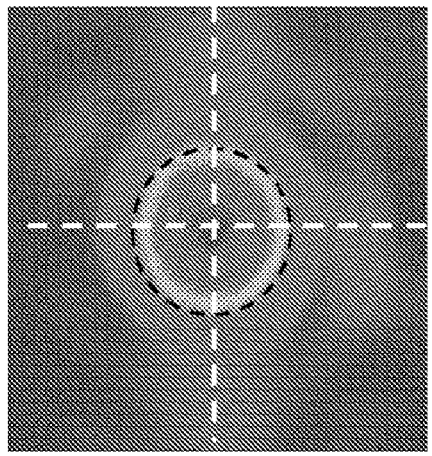
FIGS. 11A and 11B show measured images of a single channel collimated by one lenslet of a CBC lenslet array, where.
Figure 11B:
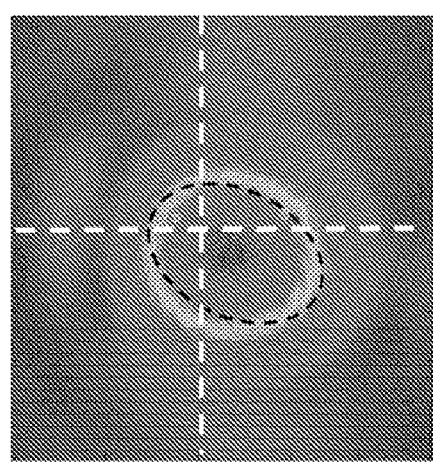

FIG. 8 shows an illustration of a 3×3 correction segments, curved or embossed over a correction optical element's surface, according to some embodiments;

Reference is now made to FIGS. 9A-11B showing images of different aberration free vs. different types of aberrations detected wavefront imaging:

FIGS. 9A and 9B show measured images of a single channel collimated by one lenslet of a CBC lenslet array, where: FIG. 9A shows a non-aberrated segment; and FIG. 9B shows an angular pointing error aberration;

FIGS. 10A and 10B show measured images of a single channel collimated by one lenslet of a CBC lenslet array, where: FIG. 10A shows a non-aberrated segment; FIG. 10B shows a defocusing aberration caused due to inaccuracies in radius of curvature of the specific lens of the specific channel; and FIGS. 11A and 11B show measured images of a single channel collimated by one lenslet of a CBC lenslet array, where: FIG. 11A shows a non-aberrated segment; and FIG. 11B shows aberrations caused to inaccuracies in fiber-to-lens connections (e.g. off-axis splicing of the fiber of the channel to the lens which may cause comatic (coma) aberration(s) and other wavefront aberrations).

EXAMPLES

Example 1 is a correction optical element (COE) for a multi-channeled coherent beam combining (CBC) system that uses at least a M×N optical fibers and a M×N collimating lenslet array, for coherent combining of M×N optical beams channeled through the M×N optical fibers, the COE being characterized in that: the COE is custom-fabricated for segmented correction of optical aberrations of the specific single CBC system by having M×N correction segments, each correction segment CSij being customized in location and configuration to correct specific and premeasured one or more optical aberrations of a corresponding output beam Bij outputted from each channel "ij" of the M×N channels of the CBC system, such as to correct optical aberrations of all M×N segments of the CBC system, wherein the COE is configured to segmentally correct optical aberrations, caused at least by inaccuracies in relative position between a respective optical fiber's output end and a center of a corresponding collimating lens Lij of the lenslet array of the specific CBC system, wherein the correction of the optical aberrations of all M×N segments is done optically and simultaneously by the COE.

In example 2, the subject matter of example 1 may include, wherein the COE is configured to segmentally correct any one or more of the following optical aberrations for each output optical beam Bij: pointing errors; focusing/collimation errors; wave-front aberrations; high-order three dimensional aberrations, spatial distribution errors; comatic aberrations; field curvature aberrations, cylinder aberrations; smile errors.

In example 3, the subject matter of any one or more of examples 1 to 2 may include, wherein segments of the COE are shaped over at least one side of the COE by using one or more of the following techniques: embossment, curving, sputtering, engraving, printing, evaporation, ion-beam deposition.

In example 4, the subject matter of any one or more of examples 1 to 3 may include, wherein the COE is made of a monolithic piece being customized to have each segment CSij thereof differently custom shaped to correct a respective aberration of the corresponding optical beam Bij of the respective channel ij.

In example 5, the subject matter of any one or more of examples 1 to 4 may include, wherein each segment of the COE comprises one or more wedges, configured for diffractive correction of the optical aberrations of the respective output optical beam Bij.

In example 6, the subject matter of any one or more of examples 1 to 5 may include, being further designed for a CBC system in which the optical fibers are connected to an input surface of an endcapping element.

In example 7, the subject matter of example 6 may include, wherein the COE is integrally connected or configured over an output surface of the lenslet array, the output curved surface comprising M×N lens-shaped curved bulges each bulge having a custom-designed correction embossment or etching, such that each of the M×N optical beams exiting an output surface of the endcapping element are both collimated and corrected by the COE.

In example 8, the subject matter of any one or more of examples 6 to 7 may include, wherein the COE is integrally or non-integrally connected to an input surface of the lenslet array, wherein bulges of lenslets of the lenslet array form the output surface of the COE and custom-shaped correction segments are located over an input surface of the COE, facing an output surface of the endcapping element.

In example 9, the subject matter of any one or more of examples 6 to 7 may include, wherein the COE is embedded in the lenslet array and the endcapping element of the CBC system, forming a single monolithic coherent beam combination, endcapping and correction element by having an output surface of the endcapping element integrally connected to an input surface of the lenslet array and an output surface of the lenslet array having a correcting 3D design embossed or debossed thereover for performing combined customized and segmented collimation and aberration correction of each optical beam.

In example 10, the subject matter of any one or more of examples 1 to 9 may include, wherein the optical fibers of the CBC system are configured for guiding light of a bandwidth ranging from 0.4-2.5 μm.

In example 11, the subject matter of any one or more of examples 1 to 10 may include, wherein the COE is embedded as part of the specific CBC system.

In example 12, the subject matter of any one or more of examples 1 to 11 may include, wherein the COE is configured for correcting aberrations of a multi-channel CBC system using M×N high power fiber lasers or fiber amplifiers.

Example 13 is a method for fabricating a correction optical element (COE) for a multi-channel coherent beam combining (CBC) system having M×N channels, using M×N optical fibers, an endcapping element connected at an input side thereof to the M×N optical fibers and a M×N collimating lenslet array, for coherent combining of M×N optical beams outputted by the endcapping element, the method comprising:

measuring one or more optical aberrations Aij of each channel ij of the M×N channels of the CBC system, based on measurement of characteristics of a wavefront of each output optical bam Bij of each corresponding channel ij, outputted from a respective lens Lij of the lenslet array which is connected to a respective optical fiber Fij;

determining, for each segment CSij of the COE to be fabricated, the required correction design for correcting all measured optical aberrations of the respective correcting segment CSij, for the specific CBC system and for a particular location and positioning of the COE to be fabricated;

fabricating a COE having M×N segments, by configuring each segment of the COE according to its respective required correction design;

placing the COE at a determined positioning for optimal aberrations correction such that each correction segment CSij of the COE is positioned in an optimal positioning in respect to the output optical beam Bij; and using the COE to simultaneously correct optical aberrations of all M×N segments of the CBC system;

wherein the COE is configured to segmentally correct optical aberrations affecting the coherent beam combining performances, caused by inaccuracies in relative position between a respective optical fiber's output end and a center of a corresponding collimating lenslet Lij of the lenslet array of the specific CBC system.

In example 14, the subject matter of example 13 may include, wherein the COE is configured to segmentally correct any one or more of the following optical aberrations for each output optical beam Bij: pointing errors; focusing/collimation errors; wave-front aberrations; high-order three dimensional aberrations, spatial distribution errors; comatic aberrations; field curvature aberrations, cylinder aberrations; smile errors.

In example 15, the subject matter of any one or more of examples 13 to 14 may include, wherein each of the output beams Bij, measured for determination of its respective one or more aberrations is directed from each optical fiber Fij, through the endcapping element and through a respective lenslet Lij of the lenslet array such that the measuring of the optical aberrations of the respective channel ij is done for aberrations detected from segments of a collimated output beam exiting the lenslet array of the CBC system.

In example 16, the subject matter of any one or more of examples 13 to 14 may include, wherein each of the output beams Bij, measured for determination of its respective one or more aberrations is directed from a respective optical fiber Fij, through the endcapping element towards a correction input surface of the COE, wherein the lenslet area is formed as an output surface of the COE.

In example 17, the subject matter of any one or more of examples 13 to 16 may include, further comprising directing light emanating from a single light source to the M×N optical fibers, using one or more optical splitting elements;

In example 18, the subject matter of any one or more of examples 13 to 17 may include, wherein the one or more aberrations of each channel ij, for all M×N channels of the CBC system are measured simultaneously or separately channel by channel, using one or more optical detectors and a processing and control unit, configured to receive and analyze output data outputted by the one or more optical detectors, in order to determine the required correction of each channel ij of the CBC system.

In example 19, the subject matter of example 18 may include, wherein the one or more optical detectors comprise one or more of: a camera, a charged coupled device (CCD), M×N photodiodes or photo detectors, M×N photo detectors each coupled to a different focusing lens or lenslet for measuring separately optical characteristics including the one or more optical aberrations for each channel ij.

In example 20, the subject matter of any one or more of examples 13 to 19 may include, wherein the placing of the COE is done by optically aligning the COE in respect to an optical plane of the optical fibers' output beams' propagation.

In example 21, the subject matter of any one or more of examples 18 to 20 may include, wherein each correction segment CSij is design is determined by measuring one or more wavefront characteristics of each beam Bij using the one or more optical detectors and generating a three-dimensional model of the correction segment CSij of the respective channel ij, based on the measured wavefront characteristics.

In example 21, the subject matter of examples 21 may include, wherein the 3D design of each correction segment CSij is a 3D mirror image of the wavefront of the beam Bij of the corresponding channel ij.

Example 23 is a system for coherent beam combining (CBC) comprising at least:

at least light source for irradiating light in a narrow wavelength band;

M×N optical fibers configured to guide light emanating from the at least one light source;

a M×N collimating lenslet array, for coherent combining of the M×N optical beams from the M×N optical fibers; and a correction optical element (COE) that is customized for segmented correction of optical aberrations of the specific single CBC system, the COE comprising M×N correction segments, each correction segment CSij being customized in location and configuration to correct specific and premeasured one or more optical aberrations of a corresponding output beam Bij emanating from a corresponding optical fiber Fij of a respective ij channel, wherein the COE is configured to segmentally correct optical aberrations affecting the coherent beam combining performances, caused by inaccuracies in relative position between a respective optical fiber's output end and a center of a corresponding collimating lens Lij of the lenslet array of the specific CBC system, and wherein the correction of all aberrations of all segments is done optically and simultaneously.

In example 24, the subject matter of example 23 may further include, wherein the CBC system further comprises an endcapping element connected at an input surface thereof to output ends of the M×N optical fibers such that an optical beam exiting from each optical fiber Fij, exits from a different segment of an output surface of the endcapping element.

In example 25, the subject matter of any one or more of examples 23 to 24 may include, wherein the CBC system further comprises at least:

one or more optical detectors located and configured to detect optical characteristics of a coherently combined output beam that have been combined by the lenslet array and corrected by the COE;

a processing and control subsystem (PCS), configured to receive data from the one or more optical detectors and analyze the received data to measure one or more CBC system performances characteristics.

In example 26, the subject matter of example 25 may include, wherein the CBC system further comprises a synchronization module for synchronizing phase and/or polarization of each channel ij such that all phases and/or polarizations of all M×N channels are synchronized, using corresponding a phase synchronization module including an array of M×N phase shifters and/or a polarization synchronization module including an array of M×N polarization controllers.

In example 27, the subject matter of any one or more of examples 23 to 26 may include, wherein the COE is configured to segmentally correct any one or more of the following optical aberrations for each output optical beam Bij: pointing errors; focusing/collimation errors; wave-front aberrations; high-order three dimensional aberrations, spatial distribution errors; comatic aberrations; field curvature aberrations, cylinder aberrations; smile errors.

In example 28, the subject matter of any one or more of examples 23 to 27 may include, wherein segments of the COE are shaped over at least one side of the COE by using one or more of the following techniques: embossment, curving, sputtering, evaporation, engraving, printing, ion-beam deposition.

In example 29, the subject matter of any one or more of examples 23 to 27 may icnlude, wherein the COE is made of a monolithic piece being customized to have each segment CSij thereof differently custom shaped to correct a respective aberration of the corresponding optical beam Bij of the respective channel ij.

In example 30, the subject matter of any one or more of examples 23 to 29 may include, wherein each segment of the COE comprises one or more wedges, configured for diffractive correction of the optical aberrations of the respective output optical beam Bij.

In example 31, the subject matter of any one or more of examples 23 to 30 may include, wherein the COE is integrally connected or configured over an output surface of the lenslet array, the output curved surface comprising M×N lens-shaped curved bulges each bulge having a custom designed correction addition, such that each of the M×N optical beams exiting an output surface of the endcapping element are collimated and corrected by the COE.

In example 32, the subject matter of any one or more of examples 23 to 31 may include, wherein the COE is integrally or non-integrally connected to an input surface of the lenslet array, wherein bulges of lenslets of the lenslet array forms the output surface of the COE and custom-shaped correction segments are located over an input surface of the COE, facing an output surface of the endcapping element.

In example 33, the subject matter of any one or more of examples 23 to 32 may include, wherein the COE is embedded in the lenslet array and an endcapping element of the CBC system, forming a single monolithic coherent beam combination, endcapping and correction element by having an output surface of the endcapping element integrally connected to an input surface of the lenslet array and an output surface of the lenslet array having a correcting 3D design embossed or debossed thereover for performing combined customized and segmented collimation and aberration correction of each optical beam.

In example 34, the subject matter of any one or more of examples 23 to 33 may include, wherein the optical fibers of the CBC system are configured for guiding light of a bandwidth ranging from 0.4-2.5 µm.

In example 35, the subject matter of any one or more of examples 23 to 34 may include, wherein the COE is configured for correcting aberrations of a multi-channel CBC system using M×N high power fiber lasers or fiber amplifiers.

Although the above description discloses a limited number of exemplary embodiments of the invention, these embodiments should not apply any limitation to the scope of the invention, but rather be considered as exemplifications of some of the manners in which the invention can be implemented.

The method and/or processes described herein may be implemented by any one or more software, and/or hardware, element apparatus, device, mechanism, electronic and/or digital computerized system, unit, processing module, device, machine, engine, etc.

The system, module, unit, device etc. or parts thereof, may be programmed to perform particular functions pursuant to computer readable and executable instructions, rules, conditions etc. from programmable hardware and/or software based execution modules that may implement one or more methods or processes disclosed herein, and therefore can, in effect, be considered as disclosing a "special purpose computer" particular to embodiments of each disclosed method/process.

Additionally or alternatively, the methods and/or processes disclosed herein may be implemented as a computer program that may be tangibly or intangibly embodied by a special purpose computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" may also include distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

A module, a device, a mechanism, a unit and or a subsystem may each comprise a machine or machines executable instructions (e.g. commands). A module may be embodied by a circuit or a controller programmed to cause the system to implement the method, process and/or operation as disclosed herein. For example, a module may be implemented as a hardware circuit comprising, e.g., custom very large-scale integration (VLSI) circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

In the above disclosure, unless otherwise stated, terms such as "substantially", "about", approximately, etc., that specify a condition or relationship characterizing a feature or features of an embodiment of the invention, are to be understood to mean that the condition or characteristic is defined to within tolerances that are acceptable for operation of the embodiment for an application for which it is intended.

It is important to note that the methods/processes and/or systems/devices/subsystems/apparatuses etc., disclosed in the above Specification, are not to be limited strictly to flowcharts and/or diagrams provided in the Drawings. For example, a method may include additional or fewer processes or steps than described in the figures. In addition, embodiments of the method are not necessarily limited to the chronological order as illustrated and described herein.

It is noted that terms such as "processing", "computing", "calculating", "determining", "establishing", "analyzing", "checking", "estimating", "deriving", "selecting", "inferring", identifying", "detecting" and/or the like, may refer to operation(s) and/or process(es) of a computer, a computing platform, a computing system, or other electronic computing device(s), that manipulate and/or transform data represented as physical (e.g., electronic or optical signal) quantities within the computer's registers and/or memories into other data similarly represented as physical quantities within the computer's registers and/or memories or other information storage medium that may store instructions to perform operations and/or processes.

Terms used in the singular shall also include a plural scope, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made i.e. enabling all possible combinations of one or more of the specified options. Further, the use of the expression "and/or" may be used interchangeably with the expressions "at least one of the following", "any one of the following" or "one or more of the following", followed by a listing of the various options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "according to some embodiments of the invention", "for example", "e.g.", "for instance" and "optionally" may herein be used interchangeably.

The number of elements shown in the Figures should by no means be construed as limiting and is for illustrative purposes only.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

The phrases "ranging/ranges between" a first indicate number and a second indicate number and "ranging/ranges from" a first indicate number "to" a second indicate number are used herein interchangeably and are meant to include the first and second indicated numbers and all the fractional and integer numerals therebetween.

The invention claimed is:

1. A correction optical element (COE) for a multi-channeled specific coherent beam combining (CBC) system, wherein the CBC system uses a fiber array comprising multiple optical fibers and a single collimation array comprising multiple collimating lenses each configured for collimation of an incoming optical beam outputted from each of the optical fibers, for coherent combining of a corresponding array of optical beams directed through the fiber array, wherein each pair of: a collimating lens of the collimation array and a corresponding optical fiber of the fiber array, defines a channel (ij), wherein the COE comprises at least:
   an array of correction segments, each correction segment (CSij) in the array of correction segments of the COE is customized in location and configuration to correct one or more optical aberrations of a corresponding output optical beam (Bij) outputted from each corresponding collimation lens (Lij) and a corresponding optical fiber (Fij),
wherein the COE is configured for customized and segmented correction of optical aberrations, caused at least due to misalignment between each corresponding optical fiber's (Fij) output end and a center of a corresponding collimating lens (Lij),
wherein the COE is configured for improving far field performances of the CBC system, wherein each correction segment (CSij) is designed by:
   measuring wavefront of a respective output optical beam (Bij), emanating from a respective optical fiber (Fij) of the fiber array and outputted from a respective collimator (Cij) of the collimation array; and
   generating a three-dimensional (3D) model of the correction segment (CSij) of the respective channel (ij), wherein the 3D model of the correction segment (CSij) is a 3D mirror image of the measured wavefront of the output optical beam (Bij) of the channel (ij), and wherein the correction segment (CSij) is configured as a diffractive element.

2. The COE of claim 1, wherein the COE is configured to segmentally correct, for each output optical beam (Bij), any one or more optical aberrations of: pointing errors focusing/collimation errors; wavefront aberrations; high-order three dimensional aberrations, spatial distribution errors; comatic aberrations; field curvature aberrations, cylinder aberrations; smile errors, manufacturing errors, errors in spaces between collimating lenses in the collimation array.

3. The COE of claim 1, wherein the COE is made of a monolithic piece being customized to have each correction segment (CSij) thereof differently custom shaped to correct one or more aberrations of the corresponding output optical beam (Bij) of the respective channel (ij).

4. The COE of claim 1, being further designed for a CBC system in which each optical fiber connects to an input surface of a corresponding part of an endcapping element.

5. The COE of claim 1, wherein the COE is integrally connected to or configured over an output surface of the collimation array.

6. The COE of claim 1, wherein the COE is integrally or non-integrally connected to an input surface of the collimation array, wherein bulges of lenses of the collimation array form the output surface of the COE and custom-shaped correction segments are located over an input surface of the COE, facing an output surface of an endcapping element.

7. The COE of claim 1, wherein the COE is embedded in the collimation array and an endcapping element of the CBC system, forming a single monolithic coherent beam combination, endcapping and correction element by having an output surface of the endcapping element integrally connected to an input surface of the collimation array and an output surface of the collimation array having a correcting 3D design embossed or debossed thereover for performing combined customized and segmented collimation and aberration correction of each optical beam.

8. The COE of claim 1, wherein each wavefront of the output optical beam (Bij) for each channel (ij) is measured by using one or more optical detectors, and the 3D model is determined by using a processing and control unit configured to receive and analyze output data outputted by the one or more optical detectors.

9. A method for fabricating a correction optical element (COE) for a specific multi-channel coherent beam combining (CBC) system having an array of channels, using a fiber array, which is an array of optical fibers and a collimation array comprising multiple collimating lenses each collimating lens being configured for collimation of an incoming optical beam, for coherent combining of an array of input optical beams outputted by an endcapping element, the method comprising:
(a) for each channel (ij) of the CBC system:
measuring wavefront of a respective output optical beam (Bij), emanating from a respective optical fiber (Fij) of the fiber (Fij) array and outputted from a respective collimator (Cij) of the collimation array;
generating a three-dimensional (3D) model of the correction segment (CSij) of the respective channel (ij), wherein the 3D model of the correction segment (CSij) is a 3D mirror image of the measured wavefront of the output optical beam (Bij) of the corresponding channel (ij);
(b) fabricating a COE having an array of correction segments, by configuring each segment of the COE according to its respective generated 3D model;
(c) placing the COE at a determined positioning for optimal aberrations correction such that each correction segment (CSij) of the COE is positioned in a desired positioning in respect to its corresponding output optical beam (Bij); and
(d) using the COE to simultaneously correct optical aberrations of at least some of the output optical beams of the CBC system;
wherein the COE is configured for customized and segmented correction of optical aberrations, caused due to misalignments between a respective optical fiber's output end and a center of a corresponding collimating lenslet (Lij) of the collimation array of the specific CBC system,
wherein the COE is configured for improving far field performances of the CBC system, and wherein each correction segment (CSij) is configured as a diffractive element.

10. The method of claim 9, wherein the COE is configured to segmentally correct one or more optical aberrations, for each output optical beam (Bij), of: pointing errors; focusing/collimation errors; wavefront aberrations; high-order three dimensional aberrations, spatial distribution errors; comatic aberrations; field curvature aberrations, cylinder aberrations; smile errors, manufacturing errors, errors in spaces between collimating lenses in the collimation array.

11. The method of claim 9, wherein each output optical beam (Bij), measured for determination of its respective one or more aberrations is directed from a respective optical fiber (Fij), through the endcapping element towards a correction input surface of the COE, wherein the collimation array is formed as an output surface of the COE.

12. The method of claim 9, further comprising directing light emanating from a single light source to the fiber array, using one or more optical splitting elements.

13. The method of claim 9, wherein each wavefront of the output optical beam (Bij) for each channel (ij) is measured by using one or more optical detectors and the 3D model is determined by using a processing and control unit, configured to receive and analyze output data outputted by the one or more optical detectors.

14. The method of claim 13, wherein the one or more optical detectors comprise one or more of: a camera, a charged coupled device (CCD), an array of photodiodes or photo detectors, M×N photo detectors each coupled to a different focusing lens or lenslet for separately measuring optical characteristics including the one or more optical aberrations for each channel (ij).

15. The method of claim 9, wherein the COE is configured to be essentially positioned in parallel to the collimation array.

16. A system for coherent beam combining (CBC) comprising at least:
at least one light source for irradiating light in a narrow wavelength band;
a fiber array, which is an array of optical fibers configured to guide light emanating from the at least one light source forming an array of input optical beams;
a collimation array, which is an array of collimating lenses, each collimating lens being configured for collimation of an incoming optical beam; and
a correction optical element (COE) that is customized for segmented correction of optical aberrations of the specific CBC system, the COE comprising an array of correction segments, wherein each correction segment (CSij) is designed by:
measuring wavefront of a respective output optical beam (Bij), emanating from a respective optical fiber (Fij) of the fiber array and outputted from a respective collimator (Cij) of the collimation array; and
generating a three-dimensional (3D) model of the correction segment (CSij) of the respective channel (ij), wherein the 3D model of the correction segment (CSij) is a 3D mirror image of the measured wavefront of the beam (Bij) of the channel (ij),
wherein the correction segment (CSij) is configured as a diffractive element, and
wherein the COE is configured for customized and segmented correction of optical aberrations, caused at least due to misalignments between a respective optical fiber's output end and a center of a corresponding collimating lens (Lij) of the collimation array of the specific CBC system,
wherein the COE is configured for improving far field performances of the CBC system.

17. The CBC system of claim 16 further comprising:
one or more optical detectors located and configured to detect optical characteristics of a coherently combined output beam that has been combined by the collimation array and corrected by the COE;
a processing and control subsystem (PCS), configured to receive output data from the one or more optical detectors and analyze the received output data to measure one or more CBC system performances characteristics of the CBC system.

18. The CBC system of claim 17 further comprising a synchronization module for synchronizing phase and/or polarization of each channel (ij) such that all phases and/or polarizations of all channels are synchronized, the synchronization module comprising a phase synchronization module configured for phase synchronization and/or a polarization synchronization module for polarization synchronization.

19. The CBC system of claim 16, wherein each wavefront of each output optical beam (Bij) for each channel (ij) is measured by using the one or more optical detectors.

* * * * *